United States Patent
Kadowaki et al.

(10) Patent No.: US 7,461,112 B2
(45) Date of Patent: Dec. 2, 2008

(54) SIGNAL PROCESSOR, SIGNAL PROCESSING METHOD, SIGNAL PROCESSING PROGRAM, RECORDING MEDIUM WITH THE SIGNAL PROCESSING PROGRAM RECORDED THEREIN AND MEASURING INSTRUMENT

(75) Inventors: Soichi Kadowaki, Kawasaki (JP); Tomonori Goto, Sapporo (JP)

(73) Assignee: Mitutoyo Corporation, Kawasaki-shi (JP)

( * ) Notice: Subject to any disclaimer, the term of this patent is extended or adjusted under 35 U.S.C. 154(b) by 754 days.

(21) Appl. No.: 11/037,270

(22) Filed: Jan. 18, 2005

(65) Prior Publication Data
US 2005/0160211 A1     Jul. 21, 2005

(30) Foreign Application Priority Data
Jan. 19, 2004   (JP)   ............................. 2004-010921

(51) Int. Cl.
*G06F 17/10* (2006.01)
(52) U.S. Cl. ...................................... 708/304
(58) Field of Classification Search ............... 708/304
See application file for complete search history.

(56) References Cited

U.S. PATENT DOCUMENTS

| | | | | |
|---|---|---|---|---|
| 5,490,094 A | * | 2/1996 | Heimburger et al. | 348/607 |
| 5,968,111 A | * | 10/1999 | Bae et al. | 708/202 |
| 6,199,084 B1 | * | 3/2001 | Wiseman | 708/304 |
| 2001/0034749 A1 | * | 10/2001 | Jiang | 708/202 |
| 2003/0033336 A1 | * | 2/2003 | Gremmert | 708/300 |

OTHER PUBLICATIONS

ISO/TR 16510-10:2000(E) Geometrical Product Specification (GPS)-Data extraction techniques by sampling and filtration—Part 10: Robust Gaussian regression filter, 1999.
S. Brinkmann et al., Accessing roughness in three-dimensions using Gaussian regression filtering, International Journal of Machine Tools & Manufacture 41 (2001) 2153-2161.
S. Brinkmann et al., Development of a robust Gaussian regression filter for three-dimensional surface analysis, Xth International Colloquium on Surface, 2000, pp. 122-132.

* cited by examiner

*Primary Examiner*—David H Malzahn
(74) *Attorney, Agent, or Firm*—Rankin, Hill & Clark LLP

(57) ABSTRACT

A digital signal value is divided to a plurality of zones along a route. A median is computed based on a difference between a digital signal value and a sum of squares of each component of a filter output value for the digital signal values for each zone. A weighting factor for digital signals in each zone is computed and updated based the median for the zone. A filter output value for the digital signal value is obtained by executing filtration using the computed weighting factor.

16 Claims, 21 Drawing Sheets

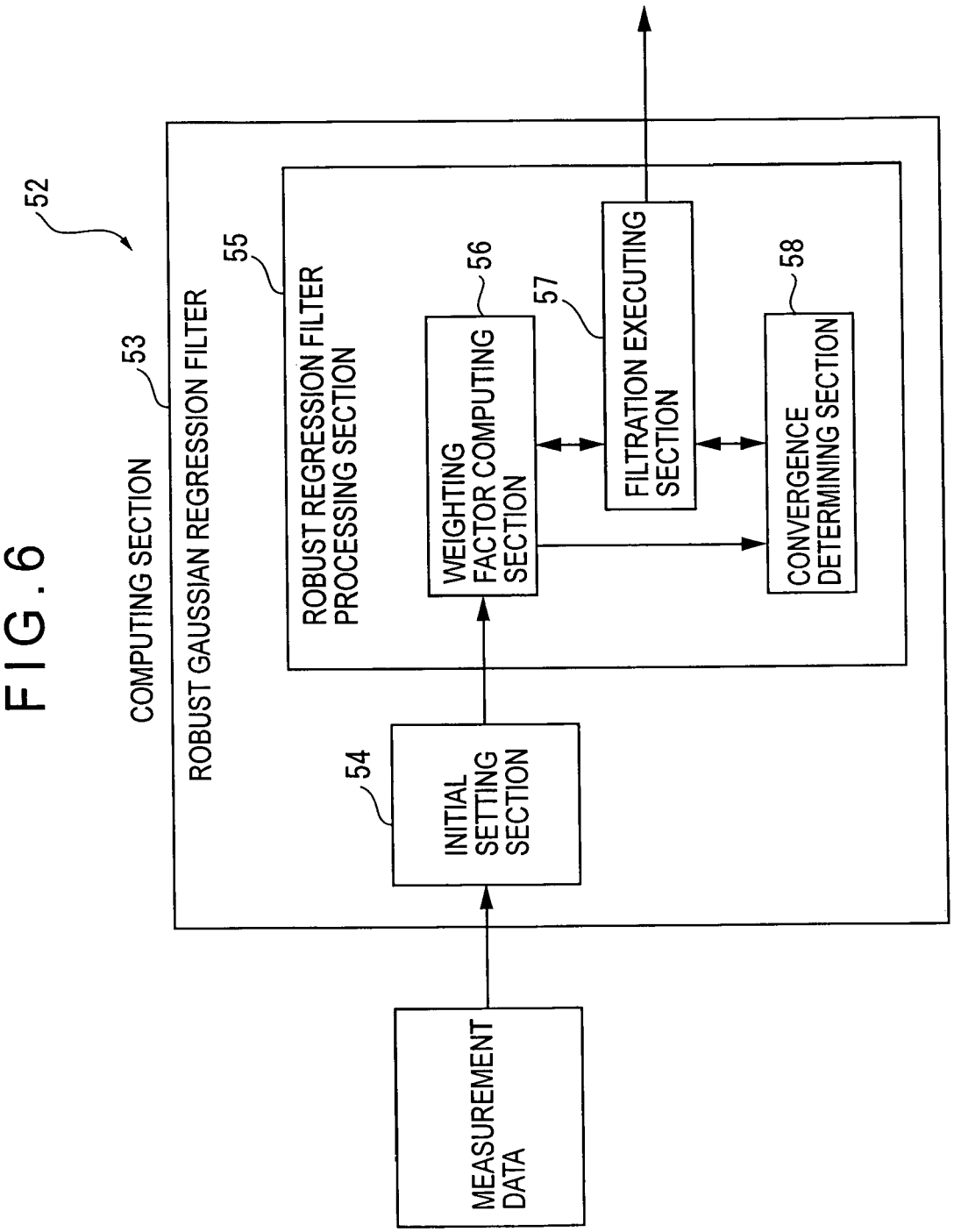

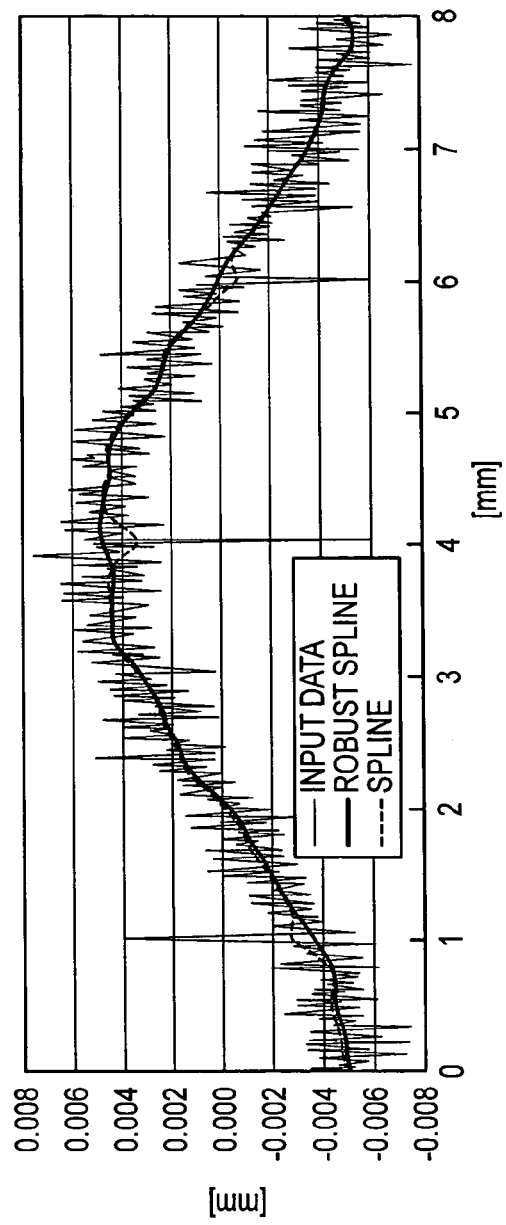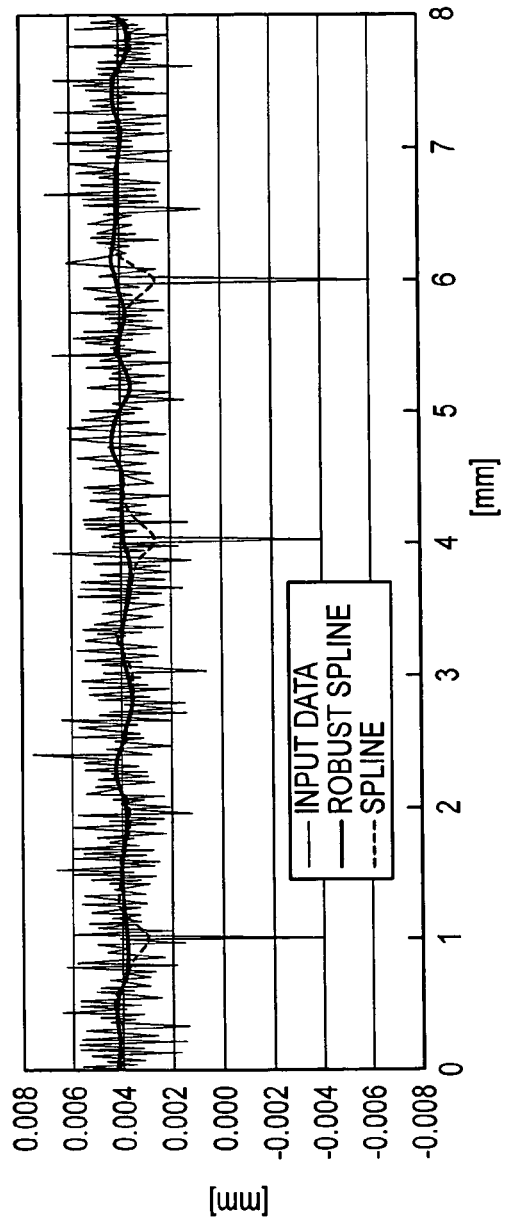
FIG. 20A
FIG. 20B

FIG.22
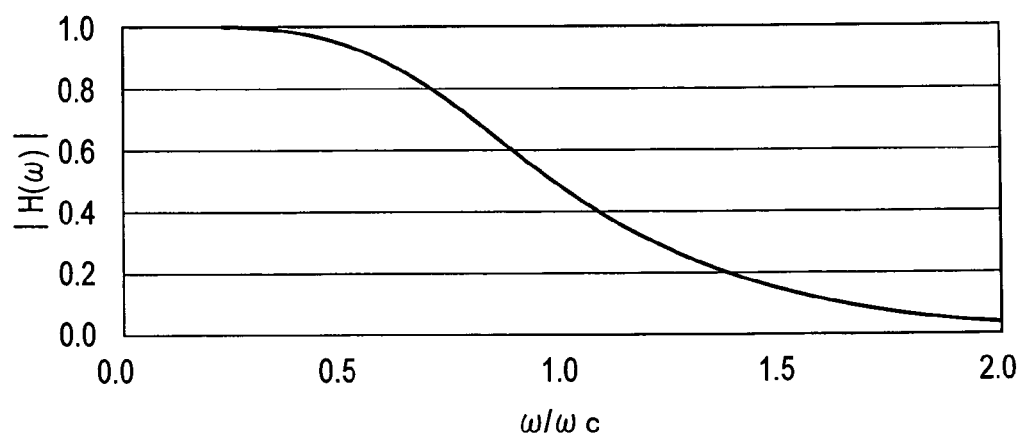
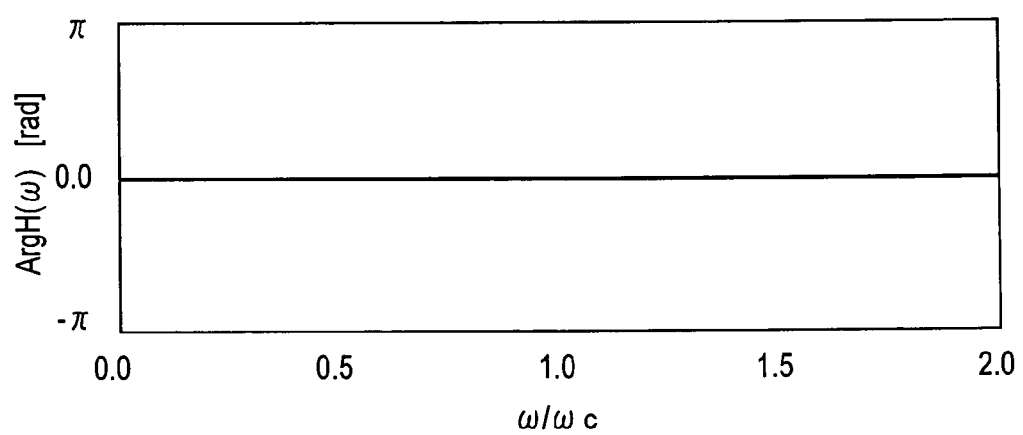

SIGNAL PROCESSOR, SIGNAL PROCESSING METHOD, SIGNAL PROCESSING PROGRAM, RECORDING MEDIUM WITH THE SIGNAL PROCESSING PROGRAM RECORDED THEREIN AND MEASURING INSTRUMENT

BACKGROUND OF THE INVENTION

1. Field of the Invention

The present invention relates to a signal processor, a signal processing method, a signal processing program, a recording medium with the signal process program recorded therein, and a measuring instrument. More specifically this invention relates to a signal processor, a signal processing method, a signal processing program each for executing the processing for filtering measurement data obtained two-dimensionally or three-dimensionally, a recording medium with the signal processing program recorded therein, and a measuring instrument.

2. Description of Related Art

There have been known various types of surface characteristics measuring instruments for measuring a contour, roughness, waviness and other properties of a surface of a workpiece for measurement such as a coordinate measuring machine for measuring a three-dimensional form of a workpiece for measurement, a contour measuring instrument or an image measuring instrument for measuring a two-dimensional contour, a roundness measuring instrument for measuring roundness, and a surface roughness measuring instrument for measuring waviness, roughness or other properties of a surface of a workpiece for measurement. These measuring instruments are used for collection of measurement data concerning a surface of a workpiece for measurement by moving a contact type sensor or a non-contact type sensor and the workpiece for measurement relatively to each other.

The measurement data collected as described above generally includes external disturbance factors such as noises.

The external disturbance factors mainly include electric/magnetic induction noises including high frequency factors, and when it is necessary to measure a contour of a surface of a workpiece for measurement, such factors as surface roughness and waviness may be the external disturbance factors.

In order to remove the external disturbance factor according to the necessity, there has been employed the method in which measurement data is converted from analog signals to digital signals and the digital signals are subjected to filtering with a filtering program for a computer. By means of this filtering processing, for instance, the high frequency factors are removed.

There has been known the Gaussian regression filter as a filter capable of executing filtering as described above (Refer to, for instance, reference 1: ISO/TR 16610-10:2000(E) Geometrical Product Specification (GPS)-Data extraction techniques by sampling and filtration-Part 10: Robust Gaussian regression filter, 1999). This filter executes the Gaussian distribution function type of weighting to measurement data $y_i$ (I=1, 2, 3, . . . ) obtained when a surface of a workpiece for measurement is measured with a prespecified sampling pitch $\Delta x$ in the x-axial direction.

Assuming the Gaussian distribution function as $s_{ik}$, the filter output $g_k$ for the measurement data $y_i$ is expressed as follows:

$$g_k = \sum_{i=0}^{n-1} y_i \cdot s'_{ik} \quad k = 0, 1, 2, \cdots n-1 \tag{1}$$

Herein the Gaussian distribution function $s_{ik}$ is standardized and is expressed by the following expression:

$$s_{ik} = \frac{1}{\lambda_c \sqrt{\ln(2)}} \cdot \exp\left\{-\frac{\pi^2 \cdot (i-k)^2 \cdot \Delta x^2}{\ln(2) \cdot \lambda_c^2}\right\} \tag{2}$$

$$s'_{ik} = \frac{s_{ik}}{\sum_{i=0}^{n-1} s_{ik}}$$

wherein $\Delta x$ indicates a sampling pitch along the x-axis and $\lambda_c$ indicates a cut-off wavelength.

Further there has been known the robust Gaussian regression filter having the robustness provided by adjusting a weighting factor for each measurement data according to a degree of residual error $d_k$ between the measurement data $y_i$ and the data $g_k$ having been subjected to filtration. (Refer to, for instance, reference 1, reference 2: S. Brinkmann et al., Accessing roughness in three-dimensions using Gaussian regression filtering, International Journal of Machine Tools & Manufacture 41 (2001) 2153-2161, reference 3: S. Brinksmann et al., Development of a robust Gaussian regression filter for three-dimensional surface analysis, Xth International Colloquium on Surface, 2000, pp 122-132).

With the Gaussian regression filter and the robust Gaussian regression filter as described above, all data can be subjected to filtration without the necessity of deleting some of measurement data or adding quasi data. Especially filtration can be carried out suppressing generation of distortion at both ends of a measurement area.

Further, with the robust Gaussian regression filter, a result of filtration can be obtained without being affected by abnormal data.

In the robust Gaussian regression filter updating a weighting factor, there has been known the method in which a weighting factor is updated based on a residual error between each data value and an output value after the initial processing for filtration, and in updating a weighting factor, each data is weighted based on a median of the residual error.

However, when one median is obtained for all of measurement data and this median is applied to all of the data, local fluctuations of the data can not be grasped.

For instance, in a case of data with a very small noise level as shown in FIG. 11, a median of a residual error between initial data and filter output is very small. Therefore when a weighting factor is updated according to the median, a number of data regarded as abnormal data and having the apparent weight of zero increases. Especially, distortions are generated at both ends of the measurement area due to the initial processing, and therefore the distortions become very larger by the robust processing associated with updating of a weighting factor.

Further, in a case where there is a step-formed abrupt change in the data as shown in FIG. 12, data becomes dull by a value equivalent to the cut-off wavelength through the initial processing. Therefore, when a weight is updated according to the median, a weight of data becomes zero at a step-like changing point in the data, and as a result the filter output waveform does not reflect an accurate form of a measured surface because of the robust processing updating a weight.

SUMMARY OF THE INVENTION

An object of the present invention is to provide a signal processor and a signal processing method making it possible to obtain a filter output value accurately following data by filtration processing using an appropriate weighting factor, a signal processing program for the method, a recording medium with the signal processing program recorded therein, and a measuring instrument.

The signal processor according to the present invention executes filtration processing for digital signal values at a prespecified dimension measured along a preset route, and includes a weighting factor calculating section for calculating a weighting factor for each of the digital signal values and also for re-calculating and updating the weighting factor, and a filtration executing section for obtaining a filter output value for each of the digital signals by executing filtration using the weighting factor calculated in the weighting factor calculating section, and the weighting factor calculating section includes a first zone generating section for generating a plurality of first zones by dividing the digital signal values to a plurality of zone along the route, and a median calculating section for calculating a median for a difference based on a sum of squares of a residual error in each component between the digital signal value and the filter output value for the digital signal value for each of the first zones, and the weighting factor calculating section calculates and updates the weighting factor based on the median in each of the first zones for the digital signal values in the first zone.

With the configuration as described above, a digital signal value is divided to a plurality of zones (first zones) by the first zone generating section, and a median is calculated for each zone by the intermediate calculating section. The median calculated for each zone is applied to the zone, and a weighting factor for digital signal values for the zone is calculated and updated by the weighting factor calculating section. Filtration is executed by the filtration executing section based on the weighting factor obtained as described above. With this configuration, as a weighting factor for digital signal values inputted for each zone can be obtained appropriately, filter output values accurately following forms of all digital signal values can be obtained.

For instance, when all of relatively similar signal values are processed in batch and a median is applied to all of the digital signal values, even a signal value slightly off from the basic value is treated as abnormal data, and the data does not contribute to the filter output value at all, but in this invention, weighting for signal values is judged for each zone, so that filter outputs each accurately reflecting features of each zone can be obtained.

The signal processor according to the present invention executes filtration processing for digital signal values at a prespecified dimension measured along a preset route, and includes a weighting factor calculating section for calculating a weighting factor for each of the digital signal values and also for re-calculating and updating the weighting factor, and a filtration executing section for obtaining a filter output value for each of the digital signals by executing filtration using the weighting factor calculated in the weighting factor calculating section, and the weighting factor calculating section includes a first zone generating section for generating a plurality of first zones by dividing the digital signal values to a plurality of zone along the route, a second zone generating section for generating a plurality of second zones corresponding to the first zones for each digital value along the route, and a median calculating section for calculating a median for a difference based on a sum of squares of a residual error in each component between the digital signal value and the filter output value for the digital signal value for each of the second zones, and the weighting factor calculating section calculates and updates the weighting factor based on the median for each of the second zones corresponding to the first zones respectively.

With the configuration as described above, a digital signal value is divided to a plurality of zones (first zones) by the first zone generating section. Further second zones corresponding to the first zones respectively are generated by the second zone generating section. The second zones correspond to the first zones respectively, each of the second zones are set, for instance, so that a median suitable for judging weighting for signal values in the first zone can be calculated. Then a median is calculated for the second zone by the median calculating section. Weighting for each signal value in the corresponding first zone is executed based on this median.

By defining a zone (second zone) for judging weighting for each signal value independently from a zone (first zone) to which the calculated median is applied, accurate judgment can be made for correctly weighting each signal value in each first zone. As a result, each signal value in each zone (first zone) can be weighted more accurately, so that filter output values more accurately reflecting features of all inputted digital values can be obtained.

In the present invention, the second zone generating section preferably generates the second zones each having a zone width larger than that of the first zone.

With the configuration as described above, second zones each reflecting not only signal values in the first zone but also those around the first zone are set. Because of this feature, the obtained filter output values sufficiently reflect feature of each zone (first zone) based on a median calculated for each zone (second zone) and also fully reflect the tendency in all of the signal values.

For instance, when a median based on only signal values within a first zone is calculated and applied to digital signal values, even signal values which should originally be regarded as abnormal values are not deleted, and in that case the general situation may not accurately be reflected by the filter output values. With the present invention, however, as signal values in the first zone are weighted based on a median reflecting not only situation in the first zone but also those around the first zone, the general tendency can always be grasped accurately.

In the present invention, the first zone generating section preferably generates the first zones so that the digital signal values for adjoining sections are continuously connected to each other and the second zone generating section preferably generates the second zones including digital signal values for at least the corresponding first zone and having overlapping portions between adjoining zones.

With the configuration as described above, each first zone is continuously connected to adjoining zones, so that the filter output values corresponding to all of the digital signal values can be obtained by connecting the filter output vales for the adjoining first zones. Further as each of the second zones include portions overlapping the adjoining zones, so that the median calculated for each second zone reflects also change in signal values for the preceding and following zones. As a result, it is possible to obtain filter output values not so off from adjoining values and sufficiently reflecting the general tendency.

In the present invention, the filtration executing section preferably executes the robust spline filtration processing using the spline function.

In the present invention, the filtration executing section preferably executes the robust Gaussian filtration processing using the Gaussian function.

With the configuration as described above, a robust spline filter or a robust Gaussian filter capable of providing the effects according to the present invention may be employed. With the robust spline filter, it is possible to suppress generation of distortions at edge portions of digital signal values and also to secure the tracking capability for waviness components having a long cycle. With the robust Gaussian filter, the processing, for instance, for adding quasi data to edge portions of digital signal values is not required, and it is possible to obtain filter output values effectively suppressing distortion at two edge portions of digital signal values.

The signal processing method according to the present invention enables execution of filtration processing for digital signal values at a preset dimension measured along a pre-specified route, and the method includes a weighting factor calculating step of calculating a weighting factor for each of the digital signal values and also re-calculating and updating the weighting factor; and a filtration executing step of obtaining filter output values for the digital signal values using the weighting factor calculated in the weighting factor calculating section, and the weighting factor calculating step includes a first zone generating step of generating a plurality of first zones by dividing the digital signal values to a plurality of zones along the route, and a median calculating step of calculating a median for a difference based on a sum of squares of a residual error in each component between the digital signal value and the filter output value for the digital signal value for the digital signal value for each of the first zones, and the weighting factor calculating step is executed for calculating and updating the weighting factor for the digital signal values for each of the first zones based on the median for the first zone.

The signal processing method according to the present invention enables execution of filtration processing for digital signal values at a preset dimension measured along a pre-specified route, and the method includes a weighting factor calculating step of calculating a weighting factor for each of the digital signal values and also re-calculating and updating the weighting factor; and a filtration executing step of obtaining filter output values for the digital signal values using the weighting factor calculated in the weighting factor calculating section, and the weighting factor calculating step includes a first zone generating step of generating a plurality of first zones by dividing the digital signal values to a plurality of zones along the route, and the weighting factor calculating section includes a first zone generating step of generating a plurality of first zones by dividing the digital signal values to a plurality of zones along the route, a second zone generating step of generating a plurality of second zones corresponding to the first zones respectively along the prespecified route for the digital signal values, and a median calculating step of calculating a median for a difference based on a sum of squares of a residual error in each component between the digital signal value and the filter output value of the digital signal value for each of the second zones, and further the weighting factor calculating step is executed for calculating and updating the weighting factor based on the median for each of the second zones corresponding to the first zones respectively for the digital signal values in each of the first zones.

With the configuration as described above, the same effects and advantages as those provided by the invention described above are provided.

The signal processing program according to the present invention makes a computer execute the signal processing method according to the present invention.

The recording medium according to the present invention records therein the signal processing program according to the present invention.

With the configuration as described above, the same effects and advantages as those provided by the present invention can be achieved. Further with the configuration in which the program is executed step by step by a computer incorporating therein a CPU (Central Processing Unit) or a memory (storage device), parameters in each step can easily be changed.

For instance, a pitch for dividing a digital signal value to a plurality of first zones or a width of a second zone can easily be changed, and therefore adjustment can easily be performed so that filter output values accurately reflecting the digital signal values can be obtained.

The program may be installed in a computer by directly inserting a recording medium with the program recorded therein into the computer, or a reader capable of reading information from a recording medium is externally connected to a computer so that the program is read out and installed in this computer from the reader. Further the program may be supplied via the Internet, LAN cable, a telephone line, a radio communication line to a computer for installation therein.

The measuring instrument according to the present invention includes a detector having a measuring section for scanning a surface of a workpiece to be measured in the contact state or in the non-contact state at its tip section, a moving unit for two-dimensionally or three-dimensionally moving the measuring section, a position detecting section for outputting a result of measurement by the measuring section as coordinate measurement data, a movement controlling section for instructing movement of the measuring section, the signal processor according to the present invention, and an output section for outputting a result having been subjected to filtration by the signal processor.

With the configuration as described above, form analysis can be carried out by fetching data concerning a form of a workpiece to be measurement by scanning a surface of the workpiece for measurement and further processing the measurement data.

BRIEF DESCRIPTION OF THE DRAWINGS

FIG. 3A shows a case where the cut-off wavelength is 0.5 mm, while FIG. 3B shows a case where the cut-off wavelength is 1.0 mm;

FIG. 4A shows a case where the cut-off wavelength is 0.5 mm, while FIG. 4B shows a case where the cut-off wavelength is 1.0 mm;

FIG. 5A shows a case where the cut-off wavelength is 0.5 mm, while FIG. 5B shows a case where the cut-off wavelength is 1.0 mm;

FIG. 6 is a functional block diagram for a computing section based on a second reference technology according to the present invention;

FIG. 8A shows a case where data with spike noise added to a folium is processed with the cut-off wavelength of 0.1 mm, while FIG. 8B shows a case where data with spike noise added to design data for an air foil is processed with the cut-off wavelength of 0.5 mm;

FIG. 20A and FIG. 20B are views each showing comparison between a result of spline processing for one-dimensional time series data and a result of robust spline processing for the same data in the third reference technology above;

FIG. 22 is a view showing the transfer characteristic according to a reference technology for the present invention.

DETAILED DESCRIPTION OF PREFERRED EMBODIMENT(S)

Embodiments of the present invention are described below with reference to the drawings.

The signal processor and signal processing method according to the present invention mainly relate to a method of computing a weighting factor in the robust processing, and as a presumption for description of the present invention, at first the Gaussian filter and robust Gaussian filter are described below as reference technologies.

First Reference Technology

Figure 1:
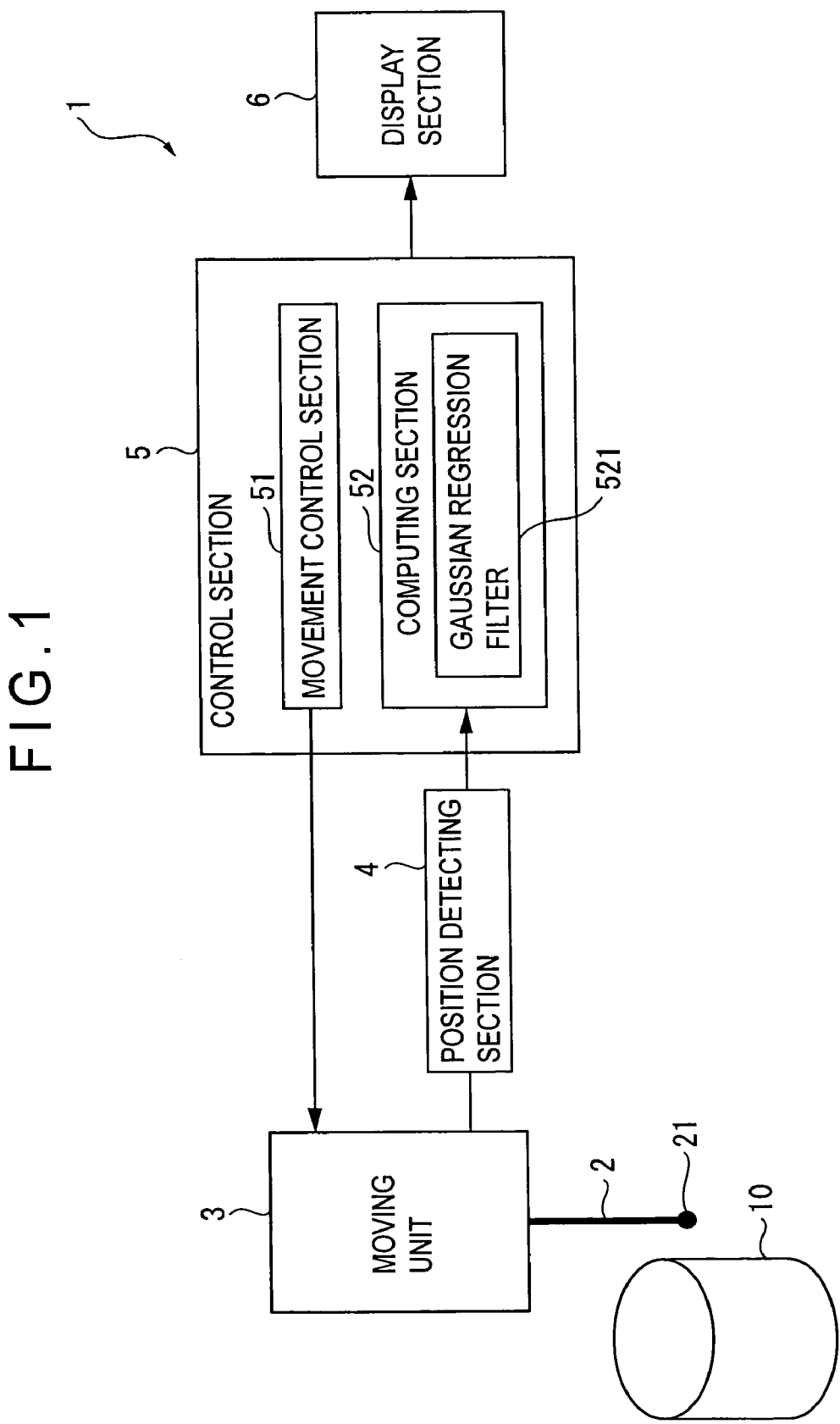
FIG. 1 is a view showing configuration of a coordinate measuring machine according to a first reference technology according to the present invention.

FIG. 1 shows a coordinate measuring machine as a measuring instrument according to a first reference technology for the present invention.

This coordinate measuring machine 1 includes a stylus (detecting section) 2 having a probe (measuring section) 21 for scanning a surface of a workpiece 10 to be measured in the contact or non-contact state provided at a tip thereof, a moving unit 3 for moving the probe 21 three-dimensionally in the x-axial, y-axial, and z-axial directions; a position detecting section 4 for detecting a position of the probe 21 and outputting data on the position as measurement data, a control section 5 for giving instructions for movement of the probe 21 and also computing the measurement data, and a display section 6 as an output section for displaying a result of computing.

The control section 5 includes a movement control section 51 for outputting a control signal for moving the probe 21 along a surface of the workpiece 10 to be measured to the moving unit 3, and a computing section 52 as a signal processor for computing measurement data.

The computing section 52 includes a Gaussian regression filter (filtration executing section) 521 as a signal processing filter. Coordinates of the probe 21 detected by the position detecting section 4 are inputted as measurement data into the computing section 52, and the computing section 52 subjects the measurement data to the Gaussian regression.

Generally the measurement data is defined as plane curve data distributed over a plane in a three-dimensional space or as space curve data three-dimensionally distributed in a three-dimensional space, but herein for convenience of description, of the data obtained through measurement of or defined as an orthogonal coordinate system having three axes of axis x, axis y, and axis z, plane curve data on the x-y plane having a constant z-axial coordinate value is defined as two-dimensional data. The space curve data three-dimensionally present in this orthogonal coordinate system is defined as three-dimensional data.

The two-dimensional data can be obtained, for instance, by clamping the z-axial shaft of a three-dimensional measurement instrument and moving only the x-axial and y-axial shafts thereof to move the probe 21 over a surface of a workpiece to be measured and executing sampling with a prespecified pitch $\Delta 1$. In this case the measurement data has a constant z-axial coordinate value, so that the measurement data can be expressed as $(x_i, y_i)$ for convenience.

Two-dimensional data may also be obtained as measurement data $(x_i, y_i)$ by reading a curve drawn on a plane with a scanner and reading coordinate values with a prespecified pitch $\Delta 1$ on the orthogonal x-y plane.

The computing section 52 executes the Gaussian regression to the measurement data $(x_i, y_i)$ as two-dimensional data. The filter output $(g_{x,k}, g_{y,k})$ by the computing section 52 is expressed using the Gaussian distribution function with the following expression;

$$g_{x,k} = \sum_{i=0}^{n-1} x_i \cdot s'_{ik} \quad (3)$$

$$g_{y,k} = \sum_{i=0}^{n-1} y_i \cdot s'_{ik} \quad k = 0, 1, 2, \cdots n-1$$

When the sampling pitch is the length $\Delta l$ along a measurement route and the cut-off wavelength is a wavelength $\lambda'_c$ also long the measurement route, the Gaussian distribution function $s'_{ik}$ is expressed by the following expressions:

$$s_{ik} = \frac{1}{\lambda'_c \sqrt{\ln(2)}} \cdot \exp\left\{-\frac{\pi^2 \cdot (i-k)^2 \cdot \Delta l^2}{\ln(2) \cdot \lambda'^2_c}\right\} \quad (4)$$

$$s'_{ik} = \frac{s_{ik}}{\sum_{i=0}^{n-1} s_{ik}}$$

Namely the computing section 52 outputs a sum of products of the Gaussian distribution function $s'_{ik}$ and measurement data obtained by moving along the measurement route by computing the inputted two-dimensional data with the expression (3).

Operations of the coordinate measuring machine 1 having the configuration as described above for subjecting the measurement data to Gaussian regression are described below.

At first, a surface of a workpiece to be measure is scanned with the probe 21 keeping the z coordinate at a constant value. In this step, coordinate positions of the probe 21 are sampled by the position detecting section 4 with a prespecified pitch along the route for measurement, and the sampled measurement data $(x_i, y_i)$ is sent to the computing section 52. The measurement data $(x_i, y_i)$ is subjected to filtration by the Gaussian regression filter 521 in the computing section 52. Namely, the filter output $(g_{x,k}, g_{y,k})$ having been subjected to the processing with the expression (3) is obtained. The obtained filter output is displayed on the display section 6.

FIG. 2, FIG. 3, and FIG. 3B, FIG. 4B, FIG. 5A and FIG. 5B each shows a result of Gaussian filtration of two-dimensional data.

Figure 2:
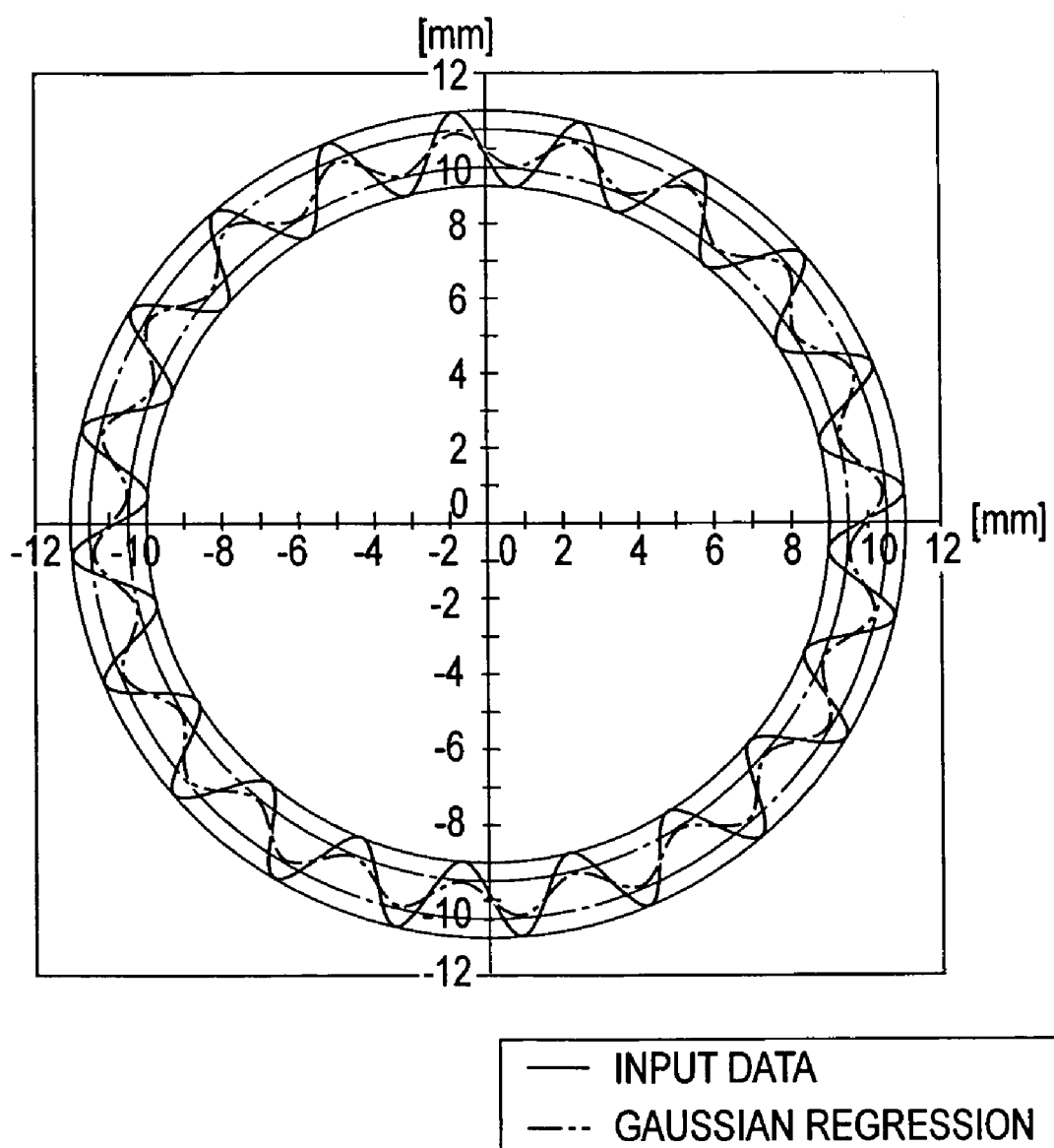
FIG. 2 is a view showing a result of the Gaussian filtration to two-dimensional data in which a sinusoidal wave with the amplitude of 1 mm is overlaid on a circle with the radium of 10 mm.

FIG. 2 shows a result of Gaussian filtration of two-dimensional data in which a sinusoidal wave with the amplitude of 1 mm having the same wavelength as the cut-off wavelength is overlaid on a circle with the radius of 10 mm. It can be understood from FIG. 2 that the amplitude of the sinusoidal wave was attenuated to 0.5 mm due to the filtration. Namely, it is understood that the amplitude was reduced by 50%.

Figure 3A:
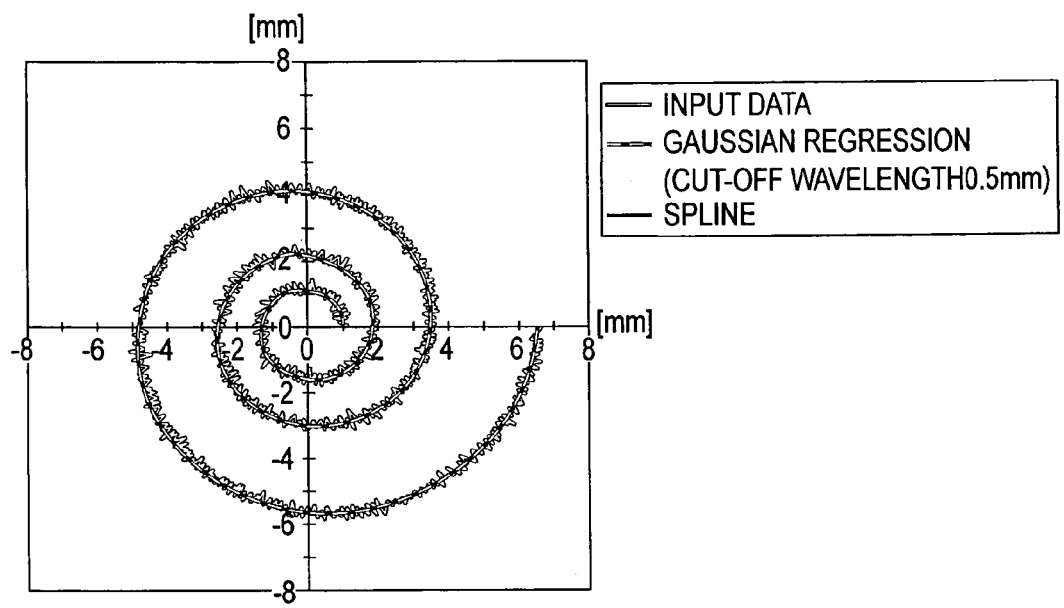
FIG. 3A and FIG. 3B are views each showing the Gaussian filtration to two-dimensional data in which Gauss noise with the standard deviation of 0.1 mm is overlaid on a logarithmic spiral.
Figure 3B:
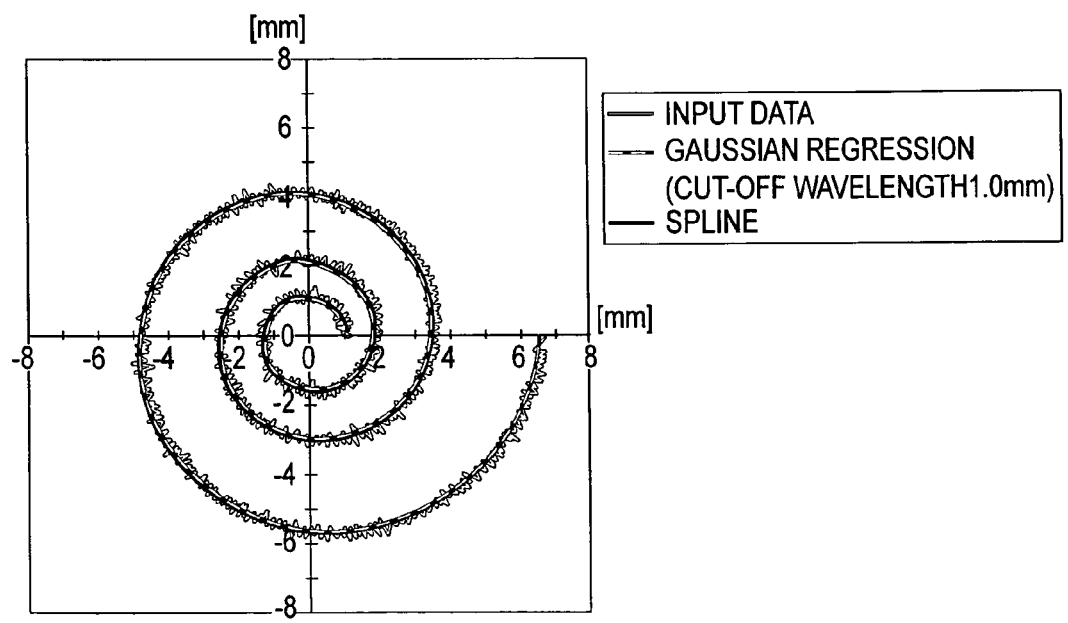

FIG. 3A and FIG. 3B are views each showing a result of Gaussian filtration of two-dimensional data in which Gauss noise with the standard deviation of 0.1 mm is overlaid on a logarithmic spiral. FIG. 3A shows a case where the cut-off wavelength is 0.5 mm, and FIG. 3B shows a case where the cut-off wavelength is 1.0 mm.

Figure 4A:
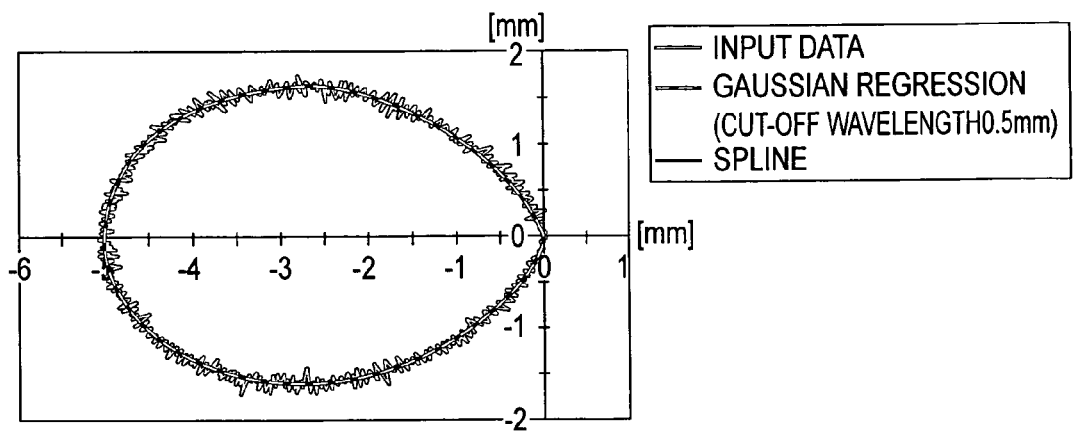
FIG. 4A and FIG. 4B are views each showing a result of Gaussian filtration to two-dimensional data in which the Gauss noise with the standard deviation of 0.1 mm is overlaid on a folium.
Figure 4B:
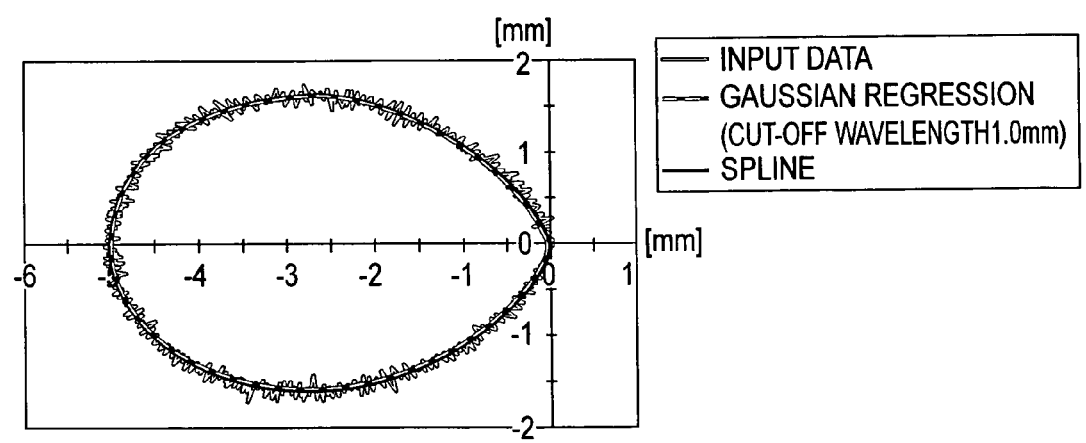

FIG. 4A and FIG. 4B are views each showing a result of Gaussian filtration of two-dimensional data in which Gauss noise with the standard deviation of 0.1 mm is overlaid on a folium. FIG. 4A shows a case where the cut-off wavelength is 0.5 mm, and FIG. 4B shows a case where the cut-off wavelength is 1.0 mm.

Figure 5A:
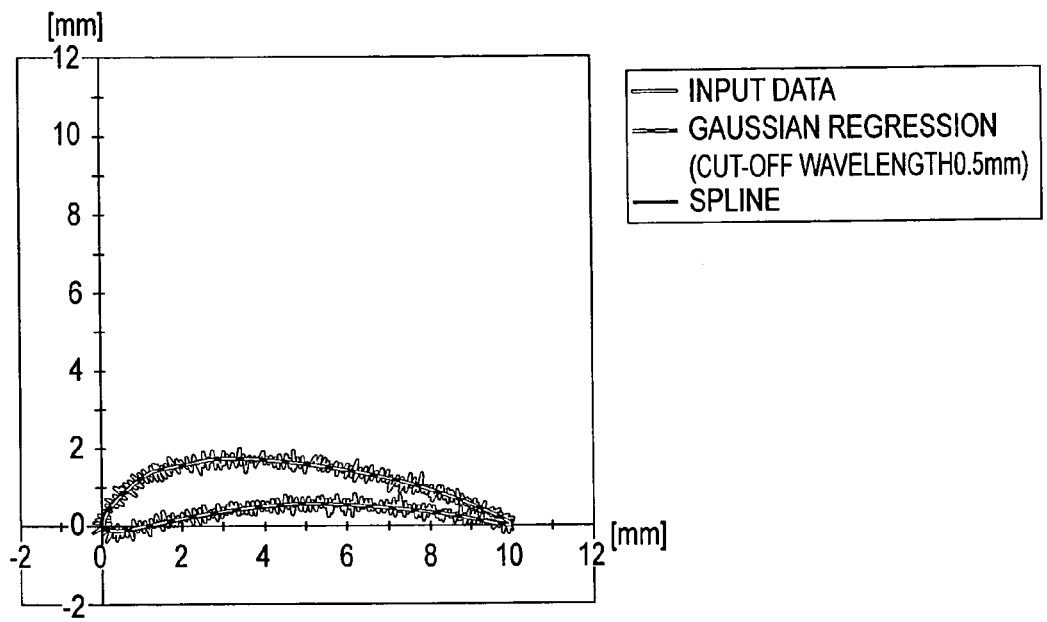
FIG. 5A and FIG. 5B are views each showing a result of Gaussian filtration to two-dimensional data in which Gauss noise with the standard deviation of 0.1 mm is overlaid on design data for a air foil.
Figure 5B:
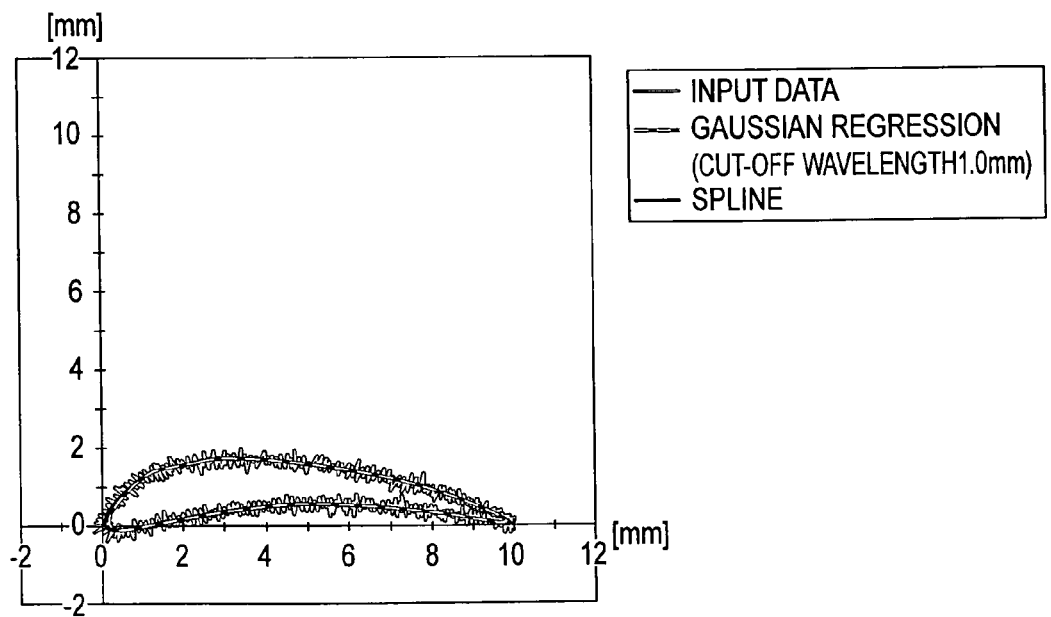

FIG. 5A and FIG. 5B are views each showing a result of Gaussian filtration of two-dimensional data in which Gauss noise with the standard deviation of 0.1 mm is overlaid on design data for an air foil. FIG. 5A shows a case where the cut-off wavelength is 0.5 mm, and FIG. 5B shows a case where the cut-off wavelength is 1.0 mm.

As shown in FIG. 3A and FIG. 3B to FIG. 5A and FIG. 5B, it can be understood that the same smooth result as that provided by a spline filter can be obtained when two-dimensional data is subjected to Gaussian filtration.

With the first reference technology as described above, the following effects are provided.

(1) Even when measurement data is two-dimensional data, Gaussian regression can be carried out. Therefore, It is possible to subject measurement data obtained by scanning the workpiece 10 to be measured along a measurement route on a plain with a prespecified pitch to filtration. This makes it possible to perform form analysis based on the measurement data obtained by scanning with a prespecified pitch along the measurement route, so that, a changing point in a form can be grasped more accurately as compared to a case where measurement data is obtained by scanning with a prespecified pitch in the x-axial direction. For instance, a changing point from a straight region to a circular region or a border of a step can be grasped more accurately, so that precision of form analysis can be improved.

(2) Two-dimensional data can be subjected to Gaussian regression processing, so that filtration can be performed suppressing generation of distortions at edge portions of a measurement area.

Reference Variant 1

A reference variant 1 of the reference technology for this invention is described below. The basis configuration of the reference variant 1 is the same as that in the first reference technology, but the reference variant 1 is characterized in that the computing section 52 executes filtration of three-dimensional data (x, y, z) obtained by three-dimensional measurement.

In the computing section 52 executing filtration of the three-dimensional data as described above, the filter output $(g_{x,k}, g_{y,k}, g_{z,k})$ from the Gaussian regression filter 521 is expressed by the following equations:

$$g_{x,k} = \sum_{i=0}^{n-1} x_i \cdot s'_{ik} \quad (5)$$

$$g_{y,k} = \sum_{i=0}^{n-1} y_i \cdot s'_{ik}$$

$$g_{z,k} = \sum_{i=0}^{n-1} z_i \cdot s'_{ik}$$

The Gaussian distribution function is expressed like the equation (4) using the sampling pitch $\Delta l$ along a measurement route and the cut-off wavelength $\lambda'_c$ along the measurement route.

With the reference variant 1, the same advantages as those provided by the first reference technology are provided. Namely, even when measurement data is three-dimensional data, correct filtration can be executed by means of Gaussian regression.

Second Reference Technology

A second reference technology for the present invention is described below.

This second reference technology is characterized in that the robust regression is executed by the robust estimation method using weighting factor for each measurement data in filtration.

The basic configuration of the second reference technology is the same as that in the first reference technology, but is different from the latter in configuration of the computing section 52. FIG. 6 is a functional block diagram showing the computing section 52.

The computing section 52 includes a robust Gaussian regression filter 53 (a signal processing filter), and the robust Gaussian regression filter 53 includes an initial setting section 54 for initially executing not-robust filtration of measurement data, and a robust regression filter processing section 55 for executing robust filtration by repeatedly computing a weighting factor.

The initial setting section 54 executes the Gaussian regression in the initial state, and has the same configuration as that of the Gaussian regression filter 521 in the first reference technology. This is the same meaning as that all of weighting factor $\delta$ are set to "1" in the initial setting section 54.

The robust regression filter processing section 55 includes a weighting factor computing section (a weighting factor calculating section) 56 for computing (calculating) a weighting factor $\delta$, and a filtration executing section for computing an output value ($g_{x,k}$, $g_{y,k}$) by executing computing for filtration, and a convergence determining section (a convergence judging section) 58 for determining (judging) convergence of a weighting factor $\delta$.

The weighting factor computing section 56 computes a weighting factor for measurement data.

In the following descriptions, it is assumed that a distance between the measurement point ($x_i$, $y_i$) and a filter output for the measurement point is $d_k$ and a filter output (a discreteness point) from the filtration executing section in m-th time processing is ($g^m_{x,k}$, $g^m_{y,k}$).

$$d^m_k = \sqrt{(x_i - g^m_{x,k})^2 + (y_i - g^m_{y,k})^2} \qquad (6)$$

In this step, the weighting factor computing section 56 computes a weighting factor $\delta$mk with the median data $\beta$ standardized with the standard deviation $\sigma$ and a prespecified constant c and using the adaptive type of biweight method.

$$\delta^m_k = \begin{cases} \left\{1 - \left(\frac{d^m_k}{\beta \cdot c}\right)^2\right\}^2 & d^m_k < \beta \cdot c \\ 0 & d^m_k \geq \beta \cdot c \end{cases} \qquad (7)$$

The median data $\beta$ standardized by a standard deviation is expressed by the following equation:

$$\beta = \text{median}\left\{\frac{d^m_k}{\sigma}\right\} \qquad (8)$$

wherein $\sigma$ is a standard deviation for dmk.

The constant c is decided by the following equation:

$$c = \begin{cases} 6 & \beta \leq 5 \\ 10 & 5 < \beta \leq 100 \\ 20 & 100 < \beta \end{cases} \qquad (9)$$

The weighting factor computing section 56 computes a weighting factor $\delta$ through the equation (7), and outputs the computed weighting factor $\delta$ to a filtration executing section 57 and a convergence determining section 58. When it is determined by the convergence determining section 58 that the weighting factor $\delta$ has not been converged, the weighting factor computing section 56 updates the weighting factor $\delta$. Namely the weighting factor computing section 56 updates the weighting factor by computing a weighting factor $\delta^{m+1}_k$ through the equation (7) based on the filter output ($g^{m+1}_{x,k}$, $g^{m+1}_{y,k}$) by the processing in the next step in the filtration executing section 57.

The filtration executing section 57 executes the Gaussian regression using the weighting factor $\delta$ computed in the weighting factor computing section 56.

Namely the output ($g^m_{x,k}$, $g^m_{y,k}$) from the robust Gaussian regression filter using the weighting factor $\delta^{m-1}_k$ for the measurement data ($x_i$, $y_i$) is expressed by the following equations:

$$g^m_{x,k} = \sum_{i=0}^{n-1} x_i \cdot \delta^{m-1}_k \cdot s'_{ik} \qquad (10)$$

$$g^m_{y,k} = \sum_{i=0}^{n-1} y_i \cdot \delta^{m-1}_k \cdot s'_{ik} \qquad k = 0, 1, 2, \cdots n-1$$

The Gaussian distribution function $s'_{ik}$ is similarly expressed by the equation (4) with the sampling pitch $\Delta 1$ along the measurement route and the cut-off frequency $\lambda'_c$ along the measurement route. However, the Gaussian distribution function $s'_{ik}$ is standardized by the following equation:

$$s'_{ik} = \frac{s_{ik}}{\sum_{i=0}^{n-1} \delta^m_k \cdot s_{ik}} \qquad (11)$$

When convergence of the weighting factor $\delta^m_k$ is instructed based on determination by the convergence determining section 58, the filtration executing section 57 executes the filtration through the equation (10) with the converged weighting factor $\delta^m_k$. In this step, the filter output ($g^{m+1}_{x,k}$, $g^{m+1}_{y,k}$) is outputted from the filtration executing section 57 to the display section 6.

When it is determined by the convergence determining section 58 that the weighting factor $\delta^m_k$ has not converged yet, the filtration executing section 57 executes filtration with the weighting factor $\delta^m_k$, and outputs this filter output to the weighting factor computing section 56.

The convergence determining section 58 determines whether the weighting factor $\delta^m$ updated in the weighting factor computing section 56 has converged or not. Namely the convergence determining section 58 compares the weighting factor $\delta^{m-1}_k$ decided by the filter output ($g^{m-1}_k$) in the (m−1)th step processing to the weighting factor $\delta^m_k$ decided by the filter output ($g^m_k$) in the m-th step processing. The convergence determining section 58 makes, in this comparison, the determination concerning convergence of the weighting factor $\delta^m_k$ based on the convergence conditions expressed by the following equation:

$$\sum_{k=0}^{n-1} |\delta^m_k - \delta^{m-1}_k| < 0.02 \sum_{k=0}^{n-1} \delta^m_k \qquad (12)$$

The convergence determining section 58 outputs a result of determination concerning convergence of the weighting factor $\delta^m_k$ to the filtration executing section 57.

Figure 7:
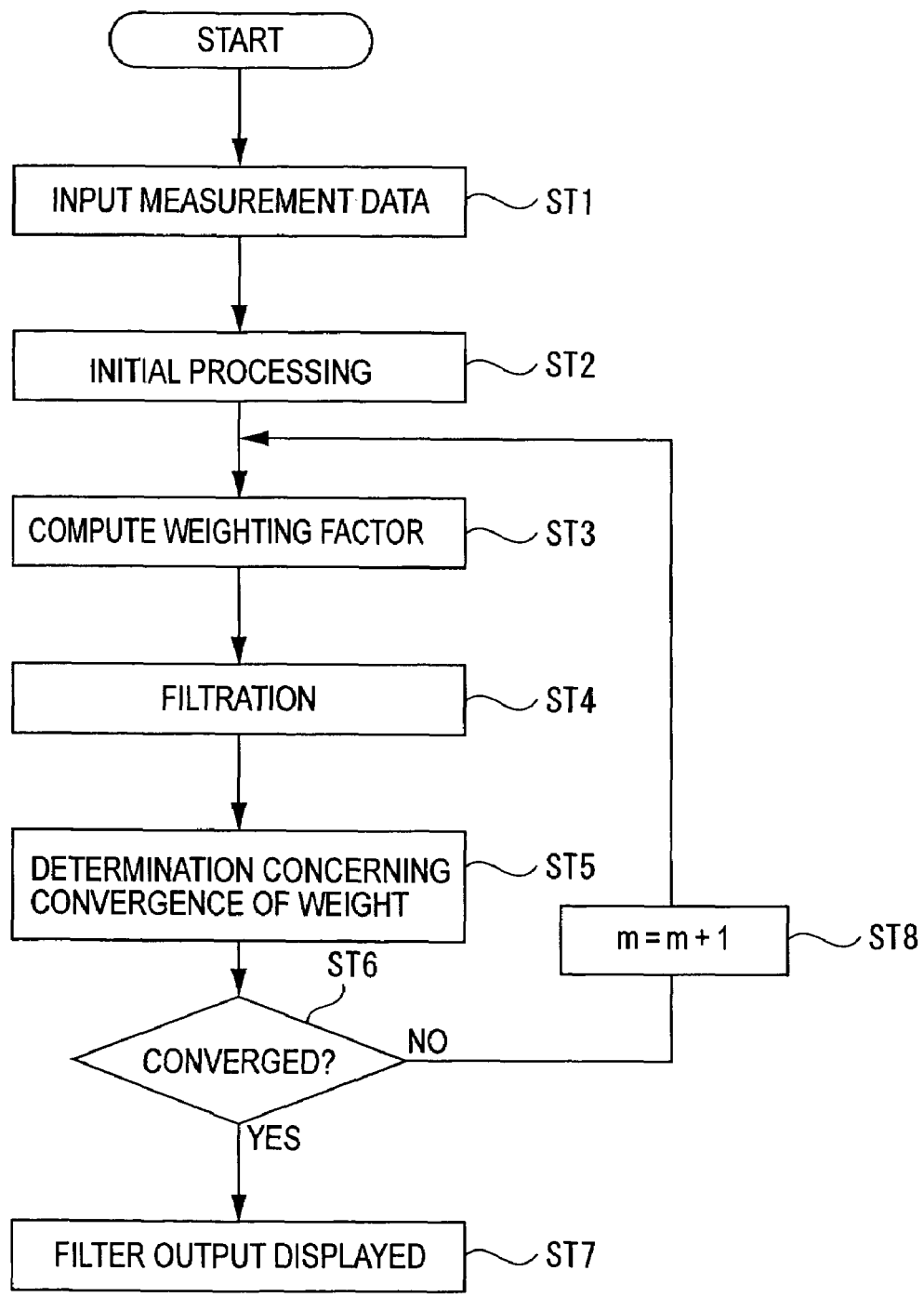
FIG. 7 is a flow chart showing the steps of robust Gaussian regression for measurement data in the second reference technology above.

Next the robust Gaussian regression for measurement data in the second reference technology having the configuration as described above is described below. FIG. 7 shows steps in the robust Gaussian regression.

At first, a surface of a workpiece to be measured is scanned with the probe 21 keeping the z coordinate at a constant value. In this step, coordinate values of the probe 21 are sampled by the position detecting section 4 with a prespecified pitch $\Delta 1$ along the measurement route, and the sampled measurement data $(x_i, y_i)$ is sent to the computing section 52 (ST 1).

In the computing section 52, at first, the Gaussian regression is executed by the initial setting section 54, and the output $(g^0_{x,k}, g^0_{y,k})$ is sent to the weighting factor computing section 56 (ST 2).

The weighting factor computing section 56 computes the weighting factor $\delta^0_k$ through the equation (10) (ST 3), and outputs a result of computing to the filtration executing section 57 and to the convergence determining section 58 (weighting factor calculation step).

The filtration executing section 57 executes computing through the equation (10) using the weighting factor $\delta^0_k$, and obtains a filter output $(g^1_x, g^1_y)$ (ST 4, filtration executing step).

On the other hand, the convergence determining section 58 compares the weighting factor $\delta^0_k$ computed in the weighting factor computing section 56 to "1" as a weight initially set and to the equation (12), and makes determination concerning the convergence (ST 5, convergence determination step).

When it is determined by the convergence determining section 58 that the weighting factor $\delta^0_k$ does not satisfy the equation for convergence determination (12) (ST 6: NO), the filter output $(g^1_x, g^1_y)$ obtained in the filtration executing section 57 is outputted to the weighting factor computing section 56.

The weighting factor computing section 56 computes the weighting factor $\delta^1_k$ in the processing in the next step (ST 8) (ST 3).

Then the processing in steps ST 3 to ST 6 is repeated by the convergence determining section 58 until the weighting factor $\delta^m_k$ converges.

When it is determined by the convergence determining section 58 that the weighting factor $\delta^k_m$ has converged (ST 6: YES), output of filtration $(g^{m+1}_{x,k}, g^{m+1}_{y,k})$ by the filtration executing section 57 is displayed on the display section 6.

Figure 8A:
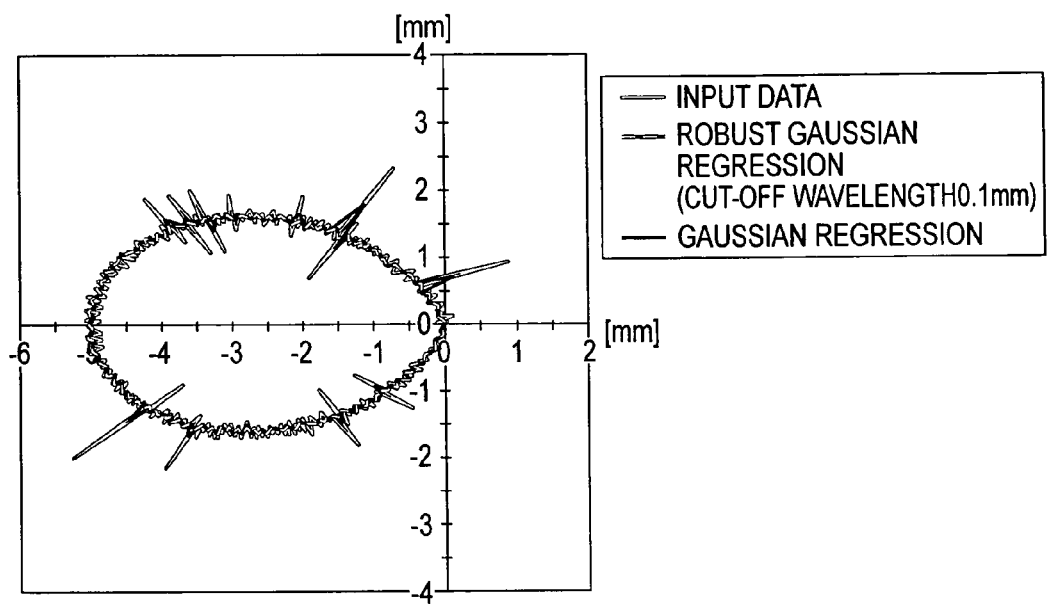
FIG. 8A and FIG. 8B are views each showing a result of robust Gaussian filtration for two-dimensional data.
Figure 8B:
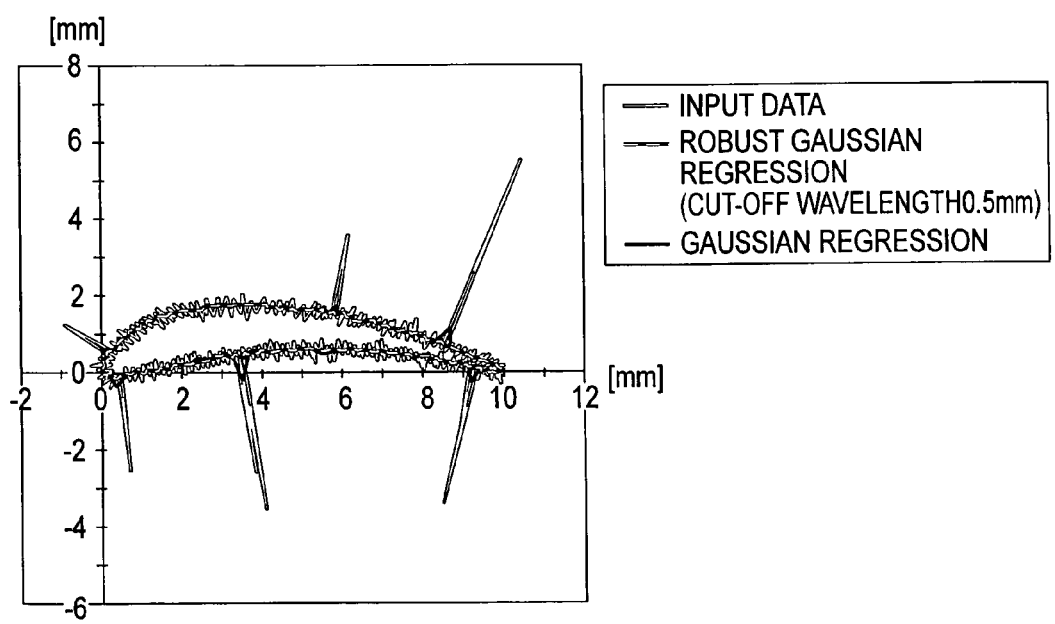

FIG. 8A and FIG. 8B are views each showing a result of robust Gaussian filtration of two-dimensional data. FIG. 8A shows a result of robust Gaussian filtration of data in which a spike noise is added to a folium with the cut-off wavelength of 0.1 mm. FIG. 8B shows a result of the robust Gaussian filtration of the data in which a spike noise is added to design data for an air foil with the cut-off wavelength of 0.5 mm.

As indicates by the results shown in FIG. 8A and FIG. 8B, with the robust Gaussian filtration, a more smooth result as compared to that by the Gaussian filtration can be obtained suppressing effects by the spike noise.

With the second reference technology having the configuration as described above, in addition to the effects (1) and (2) provided by the reference technology as described above, the following effects can be provided.

(3) The robust Gaussian filtration can be executed to two-dimensional data. Therefore, form analysis of the workpiece 10 to be measured can be performed without being affected by locally discrete particular point data.

(4) In computing the weighting factor $\delta$, a difference between measurement data and an output value by filtration is assessed based on a point-to-point distance $d_k$ between the measurement data $(x_i, y_i)$ and the output value $(g_{x,k}, g_{y,k})$ by filtration for the measurement data. By employing the point-to-point distance $d_k$ as described above, operating steps for computing are reduced with the output response speed improved. For instance, as compared to a case where computing is simply performed based on the shortest range between measurement data and a curve obtained by filtration, work load for computing can be reduced.

(5) By employing the equation (12) in determination concerning convergence, determination is made from a change rate of the weighting factor $\delta$ from step to step in the processing. As convergence of filter output can be determined in a region where the change rate of the weighting factor $\delta$ is smaller than a prespecified value in the determination concerning convergence by the robust estimation method, so that it is not necessary to repeat an unnecessary loop, so that the time required for filtration can be reduced.

Further, determination concerning convergence can also be made based on a median (median) of the residual error (point-to-point distance), sometimes convergence of the median does not reflect that of the entire outputs. In this case, by executing determination concerning convergence based on a change rate of all weighting factor $\delta$, a correctly converged filter output value can be obtained for all measurement data. As a result, precision in form analysis can be improved.

Figure 9A:
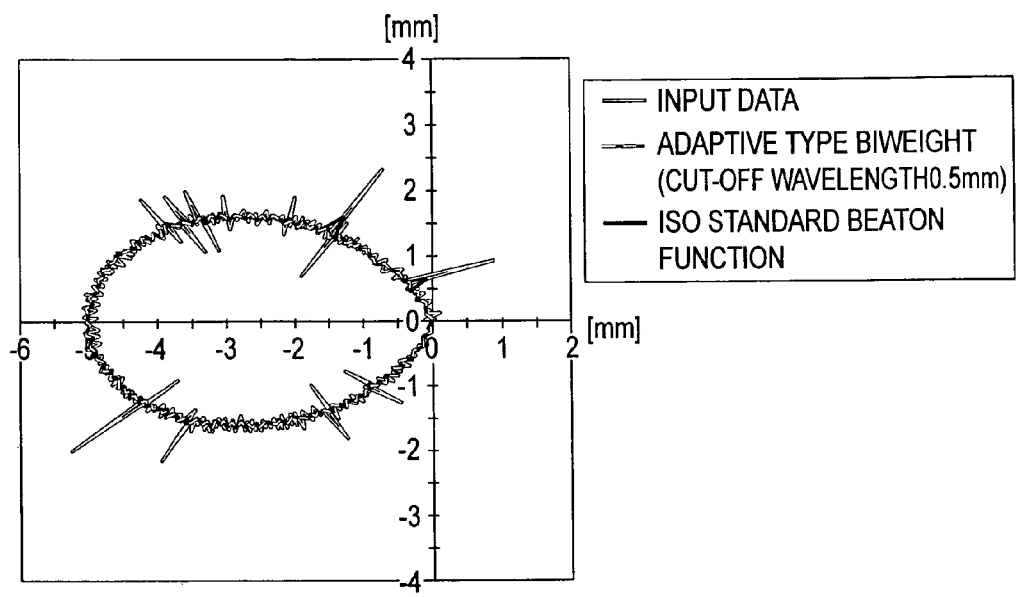
FIG. 9A and FIG. 9B are views each showing comparison between filtration using the Beaton-Function based on ISO and the robust Gaussian filtration using the adapted type biweight method according to the present invention.
Figure 9B:
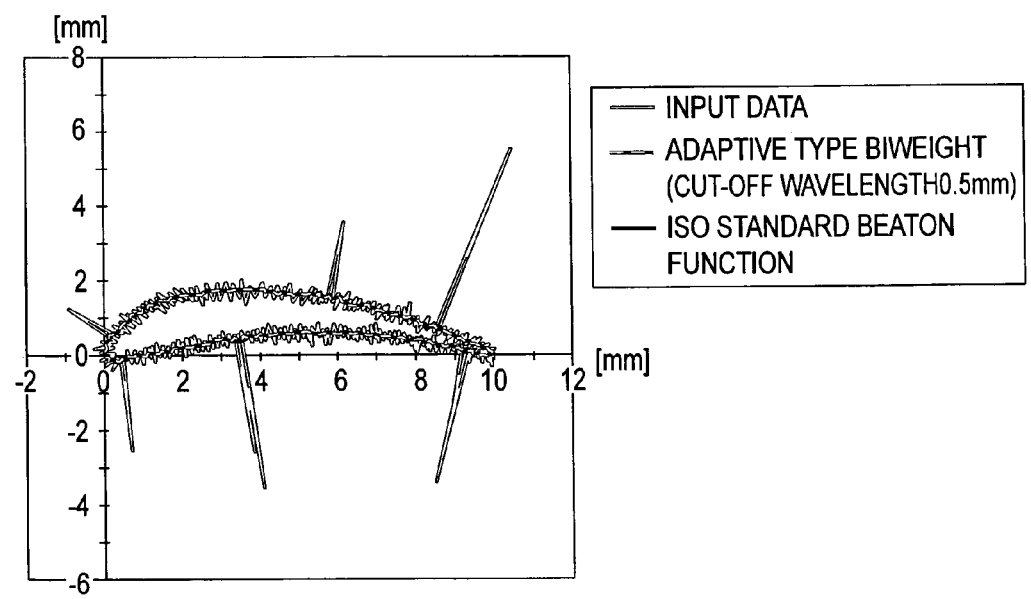

FIG. 9A and FIG. 9B are views each showing a comparison between the filtration using the Beaton-Function based on the ISO and the robust Gaussian filtration using the adaptive type of biweight method according to the present invention. Computing of a weighting factor using the Beaton-Function based on ISO and the determination concerning convergence in filtration especially for one-dimensional time-series data are described in non-patent document 1, non-patent document 2, and non-patent document 3.

As understood from the results shown in FIG. 9A and FIG. 9B, in the case where the Beaton-Function based on ISO is employed, effects by the spike noise is not completely suppressed, but with the reference technology using the adaptive type of Biweight method, effects by the spike noise is suppressed and a robust result can be obtained.

Reference Variant 2

A reference technology for the present invention is described below.

The basic configuration in the reference variant 2 is the same as that in the second reference technology, but the reference variant 2 is characterized in that the computing section 52 executes filtration of three-dimensional data $(x_i, y_i, z_i)$ obtained through three-dimensional measurement.

In the computing section 52 executing filtration of the three-dimensional data as described above, a filter output $(g_{x,k}, g_{y,k}, g_{z,k})$ from the robust Gaussian filter is expressed by the following equations:

$$g_{x,k}^m = \sum_{i=0}^{n-1} x_i \cdot \delta_k^{m-1} \cdot s'_{ik} \quad (13)$$

$$g_{y,k}^m = \sum_{i=0}^{n-1} y_i \cdot \delta_k^{m-1} \cdot s'_{ik}$$

$$g_{z,k}^m = \sum_{i=0}^{n-1} z_i \cdot \delta_k^{m-1} \cdot s'_{ik}$$

The weighting factor $\delta$ is computed through the equation (7) like in the second reference technology. In this step, the distance $d_k^m$ between the measuring point $(x_k, y_k, z_k)$ and an filter output value $(g_{x,k}^m, g_{y,k}^m, g_{z,k}^m)$ for this measuring point is expressed by the following equation:

$$d_k^m = \sqrt{(x_i - g_{x,k}^m)^2 + (y_i - g_{y,k}^m)^2 + (z_i - g_{z,k}^m)^2} \quad (14)$$

The Gaussian distribution function $s'_{ik}$ is expressed using the sampling pitch $\Delta 1$ along the measurement route and a cut-off wavelength $\lambda'_c$ along the measurement route with the equation (4) like in the first reference technology.

With the reference variant 2 as described above, the same effects as those provided in the second reference technology are provided. Namely, also when the measurement data is three-dimensional data, the robust Gaussian filtration can be executed. Therefore, form analysis for a three-dimensional workpiece to be measured can be performed accurately.

Reference Variant 3

A reference variant 3 of the present invention is described below.

The basic configuration of this reference variant is the same as those in the first reference technology, second reference technology, reference variant 1, and reference variant 2, but is characterized in that other distribution function is used in place of the Gaussian distribution function $s_{ik}$.

Figure 10:
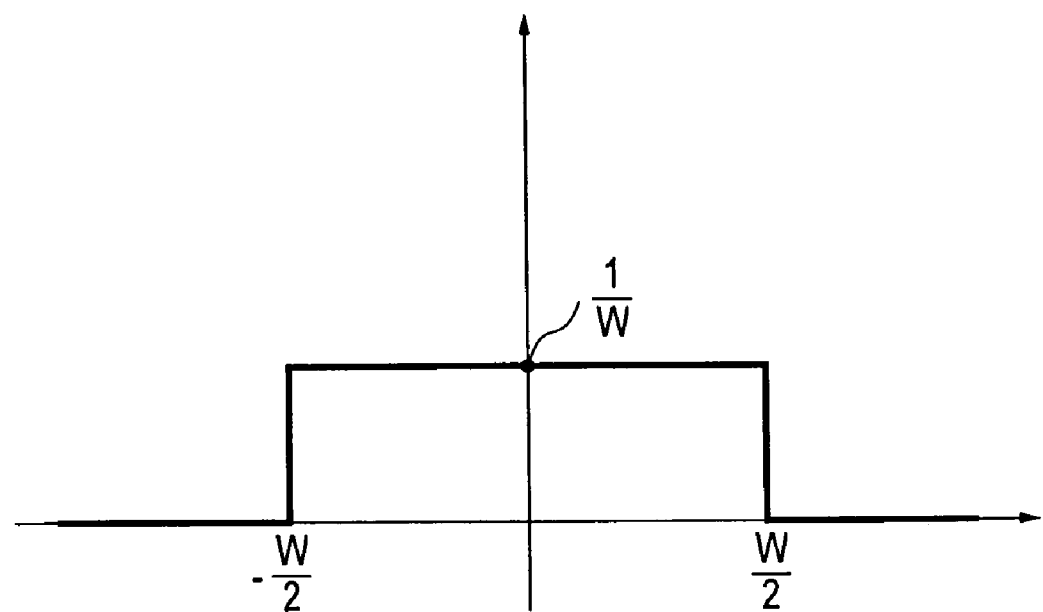
FIG. 10 is a view showing a box-type function as a reference variant of the distribution function.
Figure 11:
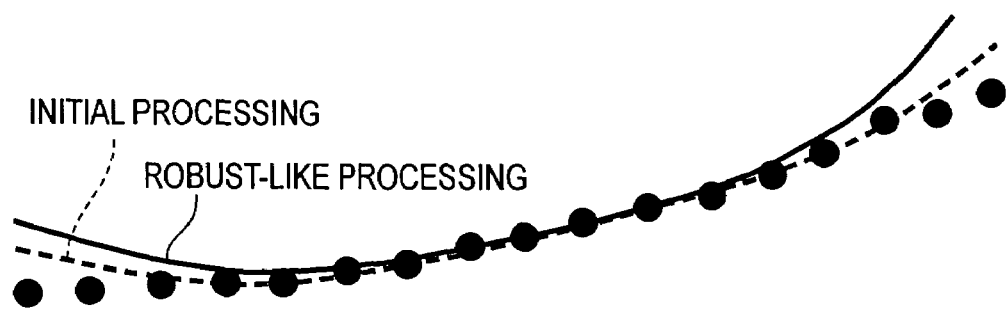
FIG. 11 is a view showing a result of initial processing and robust-like signal processing for data containing few noises.

Namely, in the reference technologies, the box-type function as shown in FIG. 10 may be employed in place of the Gaussian distribution function. This box-type function is $f(1) = 1/W$ in a zone $[-W/2, W/2]$, and in area excluding the zone $[-W/2, W/2]$, $f(1) = 0$.

By using the box-type function as described above, it is possible to construct a movement average filter.

The distribution is required only to satisfy the following equation for standardization:

$$\int_{-a}^{a} f(1) d1 = 1 \quad (15)$$

First Embodiment

Next a first embodiment of the signal processor according to the present invention is described. The basic configuration of the first embodiment is the same as that in the second reference technology, but the first embodiment is characterized in that median data $\beta$ is obtained for updating the weighting factor $\delta$.

In the second reference technology, a weighting factor is updated through the equations (7) to (9), and convergence of the weighting factor $\delta$ is determined by computing through the equation (12).

In the second reference technology, one median data $\beta$ is obtained for all of data (Refer to the equation (8)).

However, when one median data $\beta$ is applied to the entire area, local fluctuation of the data can not be grasped.

In the following descriptions, for instance, a case is assumed in which data at a very low noise level is processed. In this case, a median of the residual error between the measurement data and a filter output (median data $\beta$) is very small. Therefore, when a weight is updated through the equation (7), a number of data with the weight of zero and regarded as abnormal data increases. Especially, distortions are generated at both edges in the initial processing, so that the distortions at the two edges become disadvantageously very large due to the robust-like processing for updating a weight.

Figure 12:
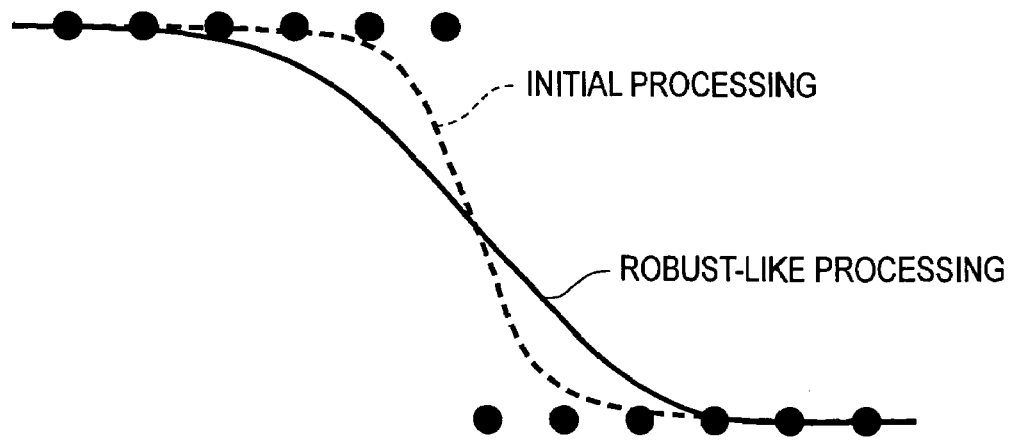
FIG. 12 is a view showing a result of initial processing and robust-like signal processing for data containing step-like changes.

Further when the data includes an abrupt step-like fluctuation as shown in FIG. 12, dullness equivalent to the cut-off wavelength is generated due to the initial processing. Therefore, when a weight is updated through the equation (7), a weight of data at the step-like changing point becomes zero, and as a result, a filter output waveform not accurately reflecting a form is provided by the robust-like processing for updating a weight.

To overcome this problem, in the first embodiment, a data area is divided to a plurality of regions, and a median data $\beta$ is obtained for each region.

Figure 13:
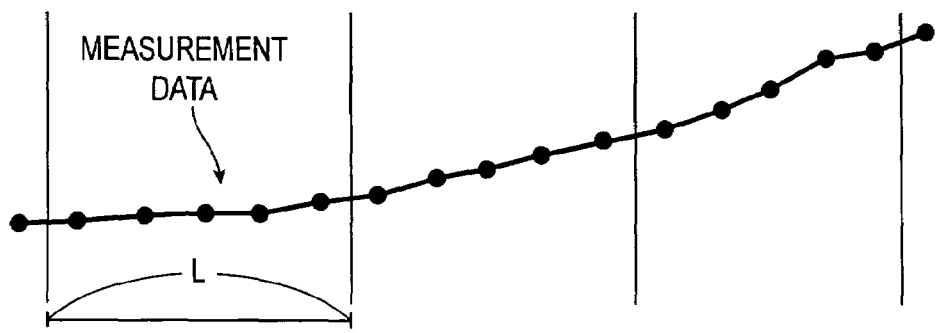
FIG. 13 is a view showing the situation in which the robust-like signal processing is being performed by dividing a signal to a plurality of zones each having a prespecified pitch in a first embodiment of the present invention.

For instance, measurement data is divided to a plurality of zones (first zones) with a prespecified pitch L as shown in FIG. 13, and median data $\beta$ is computed for each zone through the equation (8). The weighting factors $\delta$ may be computed for measurement data in each zone through the equation (7).

Figure 14:
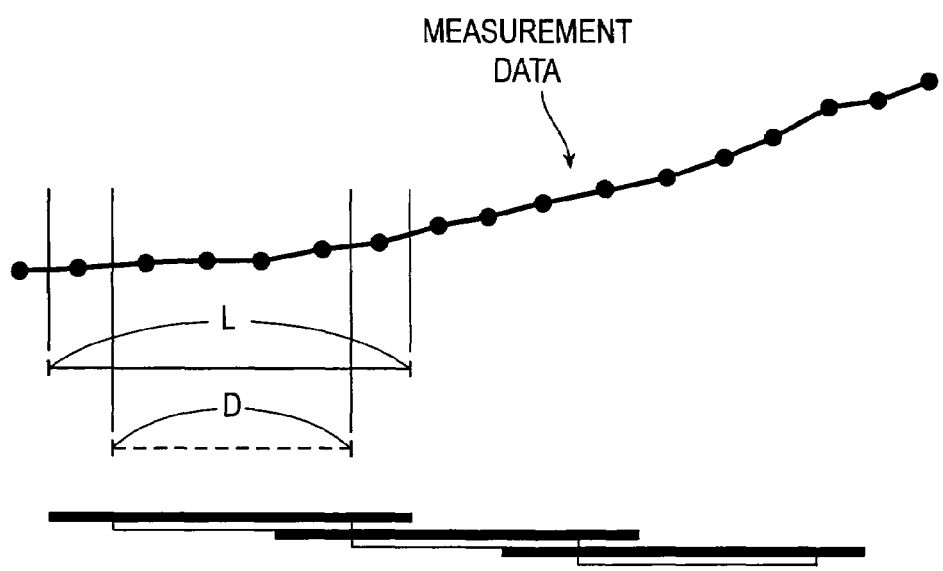
FIG. 14 is a view showing the situation in which a range for computing median data is different from a range of signal values to be processed with the median data when the robust-like signal processing is being performed by dividing a signal to a plurality of zones each having a prespecified pitch in the first embodiment of the present invention.

Alternatively, measurement data is divided to zones (second zones) with a prespecified pitch L as shown in FIG. 14, and median data $\beta$ is computed through the equation (8). Then the weighting factor $\delta$ may be computed through the equation (7) for measurement data within a zone (first zone) with a narrower pitch D as compared to those for which the median data $\beta$ is computed. Namely, a wider zone is used for computing the median data $\beta$, and this median data $\beta$ is applied to a narrower zone. A relation between the zone (with the prespecified pitch L) for which the median data $\beta$ is computed and the zone to which the median data $\beta$ is applied is as shown by the bar graph in FIG. 14.

In the descriptions above, it is assumed that the length L of each zone is identical, but the length is not always required to be identical, and each zone may have any length required for measurement of data.

With the first embodiment as described above, a weight for data in each of the zones is decided based on the median data $\beta$ computed for each zone, so that the filter output well corresponds to data in each zone.

The prespecified pitch L of a zone for which the median data $\beta$ is computed may be, for instance, the same as the cut-off wavelength.

The processing described above may be applied to filtration for executing a robust-like processing using the robust Gaussian filter or other distribution function as described in the reference variant 3. Further the processing may be applied to the robust spline filter.

Further the processing may be applied to any filter other than the robust spline filter and the robust Gaussian filter on the condition that the robust filter is used for obtaining a filter output value based on a weighting factor for measurement data (digital signal values) by the robust estimation method.

Figure 15:
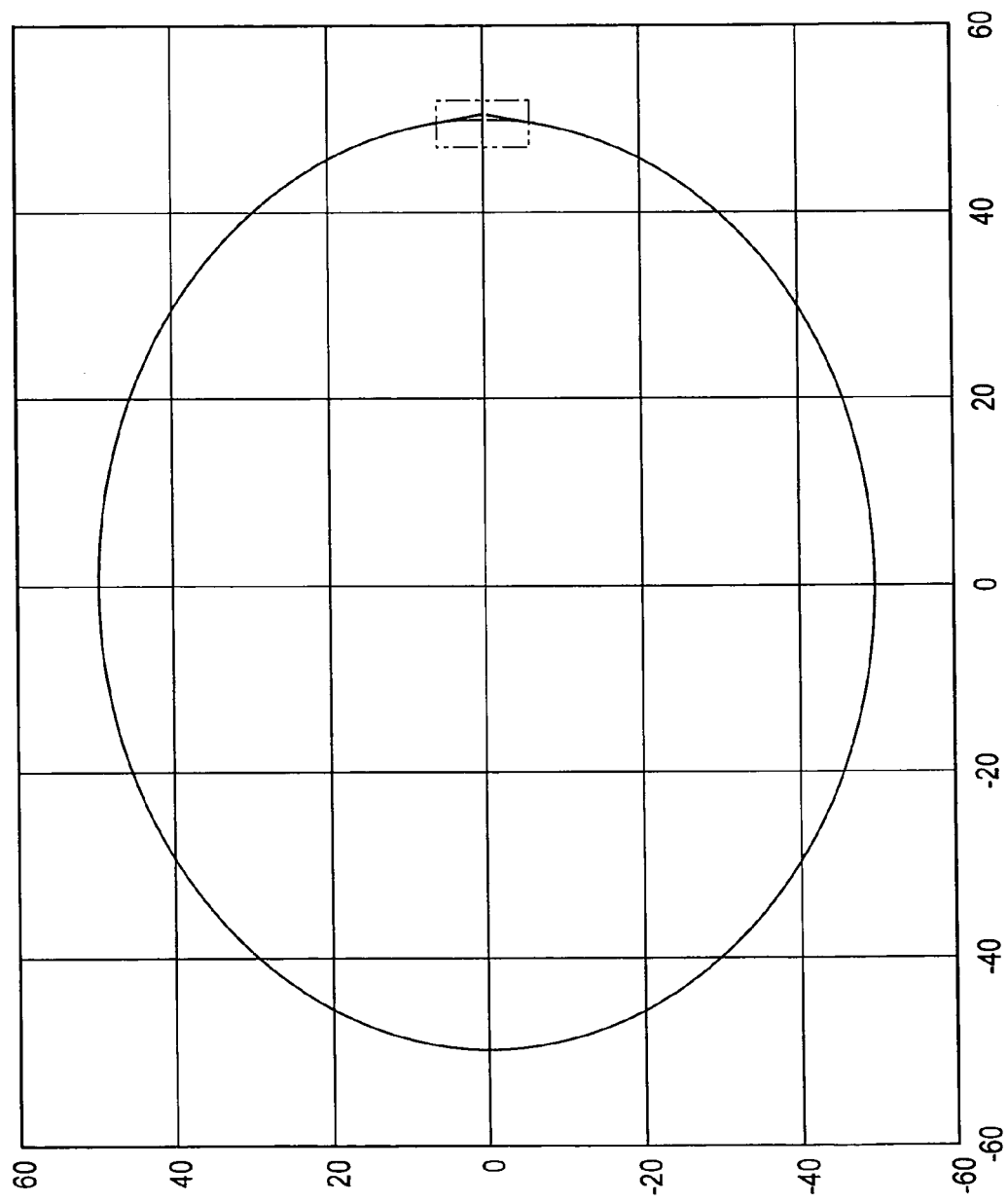
FIG. 15 is a view showing a case where the first embodiment of the present invention is applied to two-dimensional data.
Figure 16:
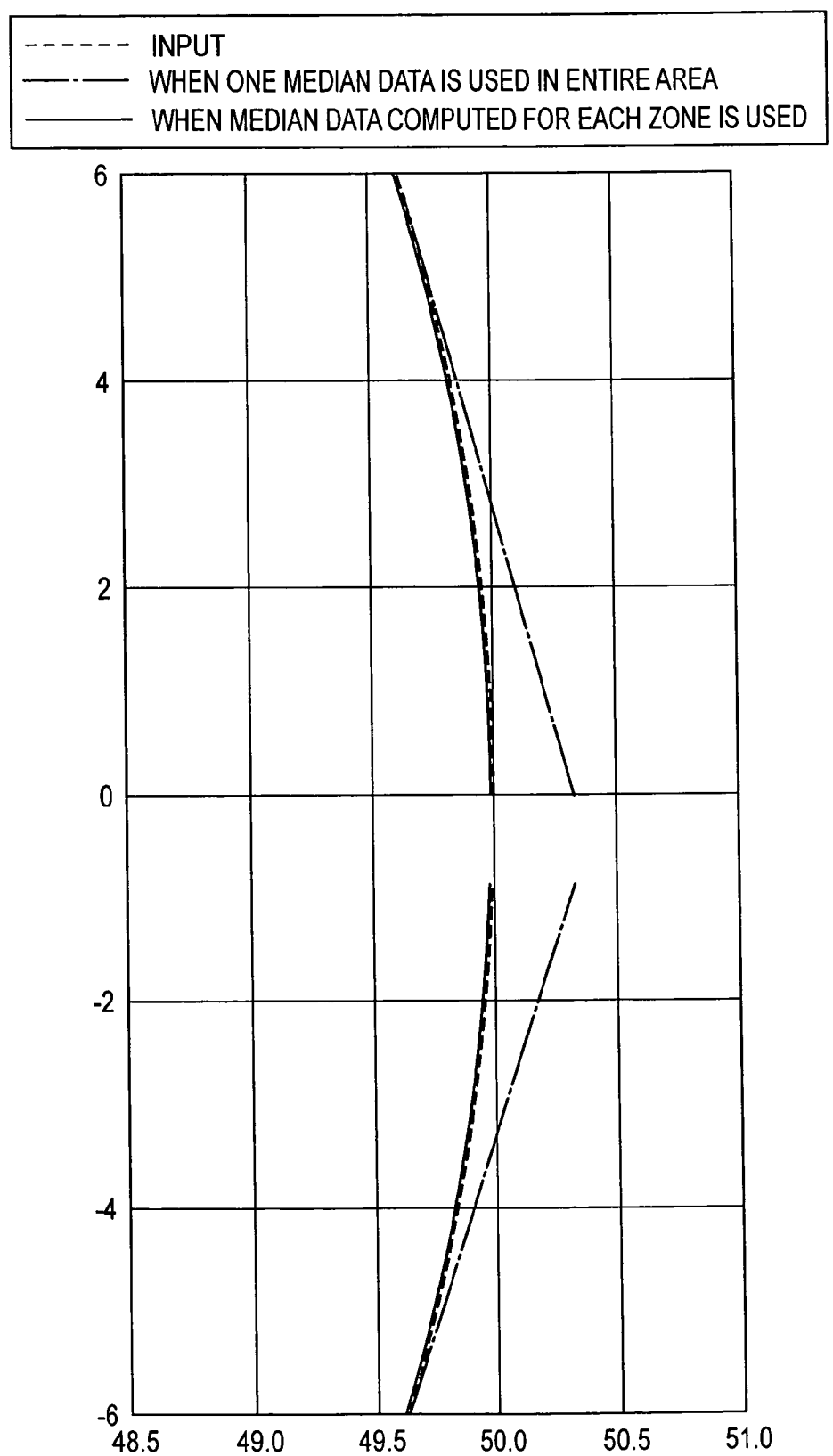
FIG. 16 is an enlarged view showing a case where the first embodiment of the present invention is applied to two-dimensional data.
Figure 17:
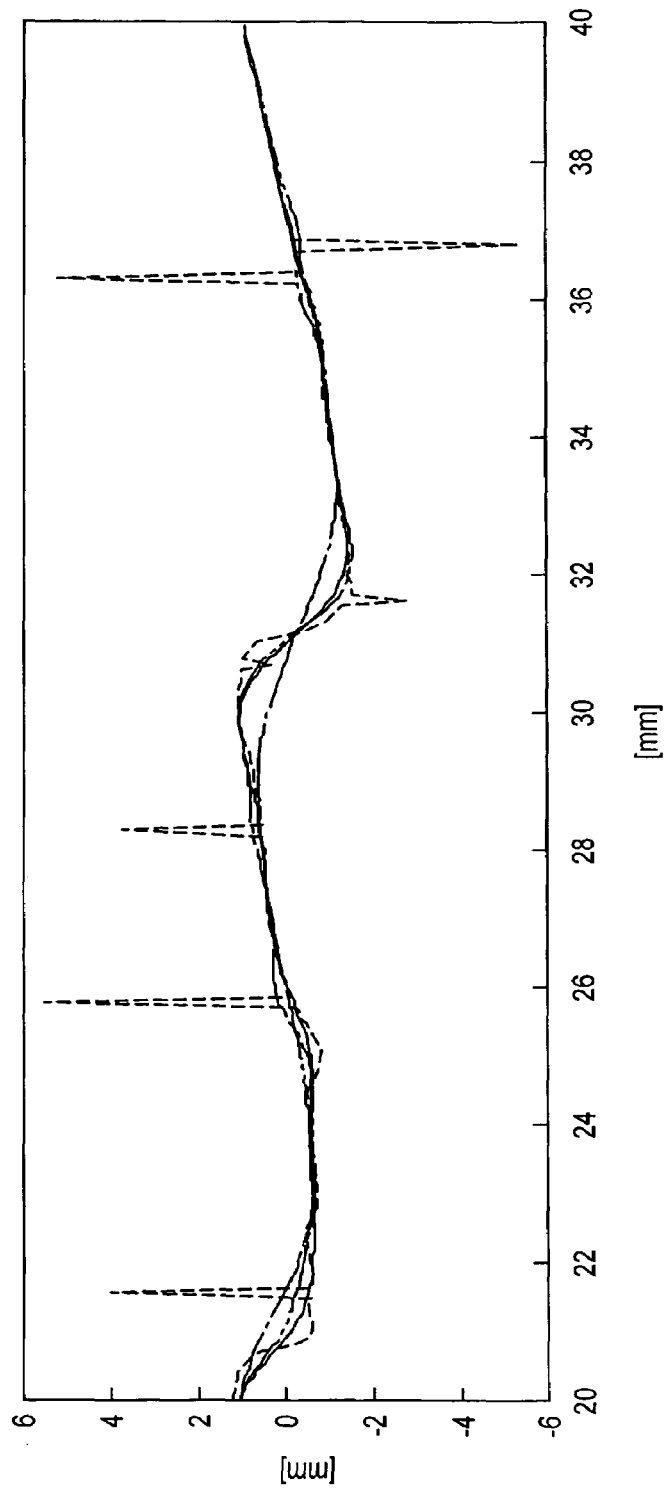
FIG. 17 is a view showing the situation in which the first embodiment above is applied to data containing step-like changes.

FIG. 15 to FIG. 17 are views each showing a result of robust spline filtration for updating a weighting factor using the median data $\beta$ obtained in the first embodiment.

FIG. 16 is an enlarged view showing a joint section when the robust spline filter is applied to a two-dimensional curve with small noises as shown in FIG. 15. It is understood from FIG. 16 that, when the median data β computed for each of divided zones, a filter output well following the input data can be obtained.

FIG. 17 shows a case where the robust spline filter is applied to input data including a step-like change. It is understood from FIG. 17 that, when the median data β computed for each of divided zones, a filter output well following the input data can be obtained.

The signal processing method using the robust spline filter is described below as a reference technology.

Third Reference Technology

At first a weighted spline filter is described.

For an instance, the spline filter is realized by minimizing a sum of squares of residual error with the measurement data as expressed by the following equation:

$$\sum_{k=0}^{n-1} \{y_k - s(x_k)\}^2 \qquad (16)$$

wherein n indicates a number of data, $y_k$ (k=0, 1, . . . n) indicates measurement data, s indicates a spline function, on the condition that the spline energy as expressed below $$\int_a^b \left\{\frac{d^2 s(x)}{dx^2}\right\}^2 dx \qquad (17)$$

is minimized. Namely the spline filter can be realized, when the condition as defined by the following equation:

$$I(s) = \sum_{k=0}^{n-1} \{y_k - s(x_k)\}^2 + \lambda \int_a^b \left\{\frac{d^2 s(x)}{dx^2}\right\}^2 dx \qquad (18)$$

is satisfied, by obtaining the spline function s minimizing I(s). In the equation above, λ indicates a Lagrange undetermined multiplier.

Assuming that $w_k$ (k=0, 1, . . . , n−1) indicates a weight for a residual error at each measuring point the following equation corresponding to the weighed spline filter can be obtained.

$$I(s) = \sum_{k=0}^{n-1} w_k \{y_k - s(x_k)\}^2 + \lambda \int_a^b \left\{\frac{d^2 s(x)}{dx^2}\right\}^2 dx \qquad (19)$$

By breaking up the spline function s with a constant pitch, and when it is assumed that the second term is expressed as shown below:

$$\alpha \sum_{k=0}^{n-1} \nabla^2 s(x_k) \qquad (20)$$

the following equation can be obtained.

$$I(s) = \sum_{k=0}^{n-1} w_k \{y_k - s(x_k)\}^2 + \alpha \sum_{k=0}^{n-1} \nabla^2 s(x_k) \qquad (21)$$

Herein it is assumed that the conditions expressed by the following equation is satisfied:

$$\nabla^2 s(x_k) = s(x_{k+1}) - 2s(x_k) + s(x_{k-1}) \qquad (22)$$

Therefore, the value sk of broken-up spline minimizing I(s) satisfies the following equation:

$$\frac{\partial I(S_0, S_1, \cdots S_{n-1})}{\partial s_k} = 0 \quad k = 0, 1, \cdots, n-1 \qquad (23)$$

Then the weighted spline filter minimizing I(s) in the equation (21) is defined.

Assuming a matrix expression for a weighted spline filter for non-cyclic measurement data, and the boundary condition for the non-cyclic measurement data is expressed by the following equations:

$$\nabla^2 s(x_0) = 0 \quad \nabla^2 s(x_{n-1}) = 0 \qquad (24)$$

the weighted spline filter is expressed as follows:

$$\frac{\partial I}{\partial s_0} = -2w_0(y_0 - s_0) + 2\alpha(s_2 - 2s_1 + s_0) \qquad (25)$$

$$\frac{\partial I}{\partial s_1} = -2w_1(y_1 - s_1) + 2\alpha(s_3 - 4s_2 + 5s_1 + 2s_0)$$

$$\frac{\partial I}{\partial s_k} = -2w_k(y_k - s_k) + 2\alpha(s_{k+2} - 4s_{k+1} + 6s_k - 4s_{k-1} + s_{k-2}) k = 2, 3, \cdots, n-3$$

$$\frac{\partial I}{\partial s_{n-2}} = -2w_{n-2}(y_{n-2} - s_{n-2}) + 2\alpha(s_{n-4} - 4s_{n-3} + 5s_{n-2} - 2s_{n-1})$$

$$\frac{\partial I}{\partial s_{n-1}} = -2w_{n-1}(y_{n-1} - s_{n-1}) + 2\alpha(s_{n-3} - 2s_{n-2} + s_{n-1})$$

and when the following substitution is employed:

$$Q = \begin{pmatrix} 1 & -2 & 1 & & & & & \\ -2 & 5 & -4 & 1 & & & & \\ 1 & -4 & 6 & -4 & 1 & & & \\ & \ddots & \ddots & \ddots & \ddots & \ddots & & \\ & & 1 & -4 & 6 & -4 & 1 & \\ & & & 1 & -4 & 5 & -2 \\ & & & & 1 & -2 & 1 \end{pmatrix} \qquad (26)$$

a matrix expression of the weighted spline filter for non-cyclic data is given by the following equation:

$$(W + \alpha Q)S = WY \qquad (27)$$

wherein W, S and Y satisfies the following expressions respectively:

$$W = \begin{pmatrix} w_0 & & & & & \\ & w_1 & & & & \\ & & \ddots & & & \\ & & & w_{n-3} & & \\ & & & & w_{n-2} & \\ & & & & & w_{n-1} \end{pmatrix} S = \begin{pmatrix} s_0 \\ s_1 \\ \vdots \\ s_{n-3} \\ s_{n-2} \\ s_{n-1} \end{pmatrix} Y = \begin{pmatrix} y_0 \\ y_1 \\ \vdots \\ y_{n-3} \\ y_{n-2} \\ y_{n-1} \end{pmatrix} \quad (28)$$

As for the matrix expression of a weighted spline filter for cyclic measurement data, assuming that the cyclic boundary condition is expressed by the following equations:

$$s_{k+n}=s_k k=0, 1, \ldots, n-1 \quad (29)$$

the following conditions is satisfied, $$\partial I/\partial S_k = -2w_k(y_k-s_k)+2\alpha(s_{k+2}-4s_{k+1}+6s_k-4s_{k-1}+s_{k-2})$$

$$k=0, 1, \ldots, n-1 \quad (30)$$

and therefore assuming that the following condition is satisfied:

$$\tilde{Q} = \begin{pmatrix} 6 & -4 & 1 & & & 1 & -4 \\ -4 & 6 & -4 & 1 & & & 1 \\ 1 & -4 & 6 & -4 & 1 & & \\ & \ddots & \ddots & \ddots & \ddots & \ddots & \\ & & 1 & -4 & 6 & -4 & 1 \\ 1 & & & 1 & -4 & 6 & -4 \\ -4 & 1 & & & 1 & -4 & 6 \end{pmatrix} \quad (31)$$

the matrix expression for a weighted spline filter for cyclic is given by the following equation:

$$(W+\alpha\tilde{Q})S=WY \quad (32)$$

The amplitude characteristic and phase characteristic of the spline filter are discussed below.

When the following equation with the weight W of 1 (unit matrix):

$$y_k=s_k+\alpha(s_{k+2}-4s_{k+1}+6s_k-4s_{k-1}+s_{k-2})$$

$$k=0, 1, \ldots, n-1 \quad (33)$$

is subjected to z-transformation taking into consideration that $z^{-1}$ indicates a delay for $\Delta x$, the following equation is given:

$$y_k=s_k+\alpha(z^{-2}-4z^{-1}+6-4z+z^2)s_k \quad (34)$$

The transfer function (Hz) for a spline filter is given by the following equation:

$$H(z) = \frac{s_k}{y_k} \quad (35)$$

$$= \frac{1}{1+\alpha(z^{-2}-4z^{-1}+6-4z+z^2)}$$

To examine the amplitude characteristic and phase characteristic, assuming the following equation:

$$z=e^{j\omega\Delta x} \quad (36)$$

the condition as expressed by the following equation is satisfied:

$$H(\omega) = \frac{1}{1+\alpha(e^{-2j\omega\Delta x}-4e^{-j\omega\Delta x}+6-4e^{j\omega\Delta x}+e^{2j\omega\Delta x})} \quad (37)$$

Herein the following condition is satisfied:

$$e^{-j\alpha}+e^{j\alpha}=2\cos\alpha \quad (38)$$

the following equation is obtained:

$$e^{-2j\omega\Delta x}-4e^{-j\omega\Delta x}+6-4e^{j\omega\Delta x}+e^{2j\omega\Delta x} \quad (39)$$

$$= 2\cos(2\omega\Delta x) - 8\cos(\omega\Delta x) + 6$$

$$= 2 - 4\sin^2(\omega\Delta x) - 8\cos(\omega\Delta x) + 6$$

$$= -16\sin^2\left(\frac{\omega\Delta x}{2}\right)\cos^2\left(\frac{\omega\Delta x}{2}\right) - 8 + 16\sin^2\left(\frac{\omega\Delta x}{2}\right) + 8$$

$$= 16\sin^4\left(\frac{\omega\Delta x}{2}\right)$$

and the amplitude characteristic is expressed by the following equation:

$$|H(\omega)| = \frac{1}{1+16\alpha\sin^4\left(\frac{\omega\Delta x}{2}\right)} \quad (40)$$

On the other hand, the phase characteristic is expressed by the following equation:

$$Arg \cdot H(\omega)=0 \quad (41)$$

and therefore it can be understood that the spline filter is a phase-compensation filter.

For instance, when a filter with 50% attenuation is realized with the cut-off frequency $\omega=\omega w$, the phase characteristic is required only to satisfy the following condition:

$$H(\omega_c) = \frac{1}{2} \quad (42)$$

and the constant $\alpha$ is given by the following equation:

$$\alpha = \frac{1}{16\sin^4\left(\frac{\omega_c\Delta x}{2}\right)} \quad (43)$$

When the cut-off frequency $\omega$ is $\omega_c$, the transfer characteristic (amplitude characteristic, phase characteristic) of the filter with 50% attenuation is as shown in FIG. 22.

Next, a solution for the weighted spline filter defined as described above is discussed below.

The matrix expression for a weighted spline filter is expressed by the following equation:

$$(W+\alpha Q)S=WY \quad (44)$$

and the matrix in the left side as expressed by the following equation:

$$M = W + \alpha Q \tag{45}$$

is a symmetric matrix.

When M is broken down to the low triangle matrix L and a diagonal matrix D by the amended Cholesky method (a matrix can very efficiently be broken down by making use of the fact that M is a sparse matrix to obtain the following equation:

$$M = LDL^T \tag{46}$$

and the weighted spline filter is expressed by the following equation:

$$LDL^T S = WY \tag{47}$$

Assuming therein as follows:

$$DL^T S = X \tag{48}$$

the following equation is given:

$$LX = WY \tag{49}$$

As L is a lower triangle matrix, X can easily be obtained. Further because of the relation as expressed by the following equation:

$$L^T S = D^{-1} X \tag{50}$$

S can easily be obtained from X obtained as described above.

In the practical application, the condition as expressed by the following equation may occur:

$$W_k^m = 0 \tag{51}$$

and in that case the matrix M may be a singular one.

Therefore, it is preferred to solve the equation by the singular value decomposition method, but when the singular value decomposition method is employed, a storage device with a large memory capacity and an extremely long period of time for computing are required. However, in application to actual measurement data, the matrix M rarely becomes singular, and in the state where the matrix M is singular, the possibility may be suspected that the measurement data itself contain some problems. Therefore, in the present invention, by applying the amended Choleskey method by Gill-Murray capable of giving a solution even when the matrix M is singular, the two workpieces of securing the computing efficiency and countermeasures against a singular matrix are simultaneously achieved.

As described above, as a weighted spline filter supported by the solving method as described above was derived, the robust spline filter can be realized by repeating computing until the condition for convergence is satisfied by updating a weight W.

Figure 18:
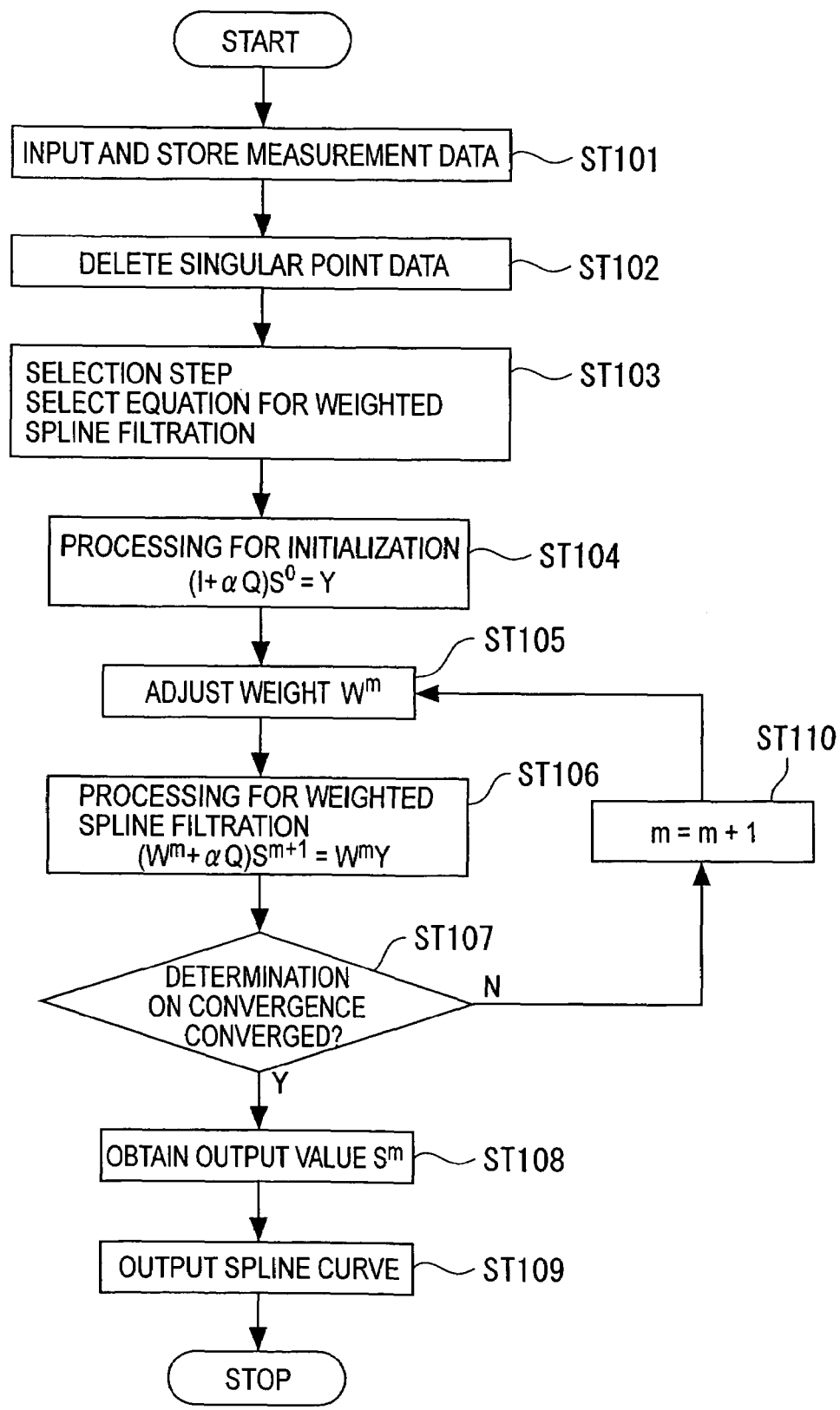
FIG. 18 is a flow chart showing the signal processing sequence in a third reference technology relating to the signal processing method according to the present invention.
Figure 19:
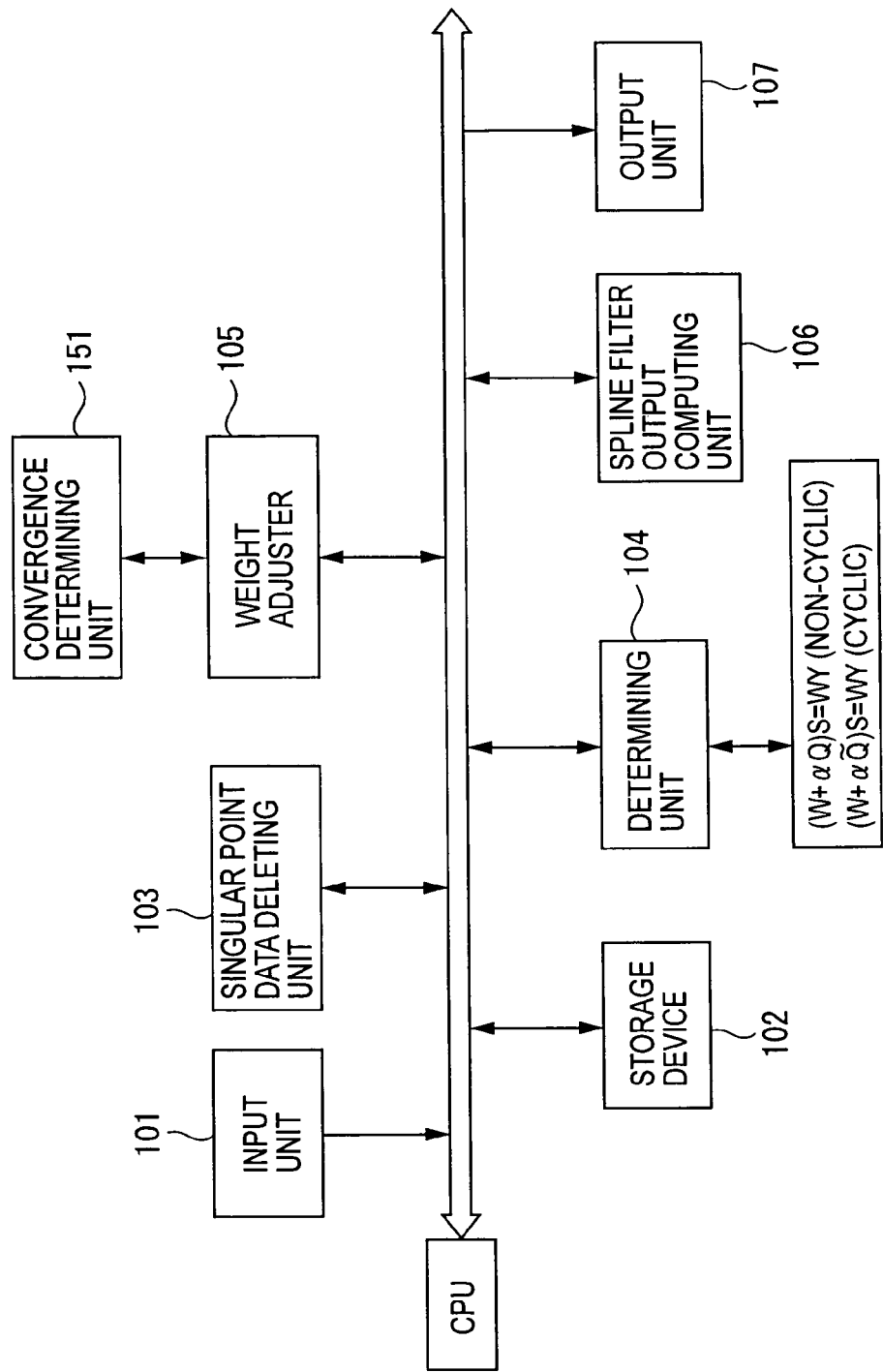
FIG. 19 is a functional block diagram showing a device for signal processing in the third reference technology above.

FIG. 18 is a flow chart showing the first processing sequence, and FIG. 19 is a functional block diagram showing a device for executing the robust spline processing. When executing this processing, at first, a measurement data input step of inputting measurement data and a selection step of selecting a weighted spline filter equation (ST 103) are executed.

In the measurement data input step, a step ST 101 for receiving measurement data from an input unit 101 such as an measuring instrument and storing the data in a storage device 102 such as a computer and a step ST 102 of deleting singular point data locally isolated with a singular point data deleting unit 103 are executed.

In the following descriptions, it is assumed that the measurement data is one-dimensional time series data obtained by a measuring instrument. Namely, the case is assumed, for instance, in which, when a probe of, for instance, a surface roughness measuring instrument is moved in one direction (x-axial direction), roughness data y is obtained with the prespecified pitch in the x-axial direction. The determination as to whether data is singular ones or not can easily be made by determining whether the difference from minimum square curve of the measurement data is not less than a prespecified value and not more than a prespecified zone width or not.

Then in the selection step ST 103, determination is made by a determining unit 104 as to whether the measurement data is non-cyclic or cyclic, and a weighted spline filter equation is selected based on a result of this determination. More specifically, which of the equation (27) and equation (32) is to be used is determined depending on a result of determination as to whether the measurement data is non-cyclic or cyclic.

The processing for initialization (ST 104) is executed, and in this step, an initial value S0 of an output value by the spline filtration is obtained assuming that W is equal to I (unit matrix) (non-robust spline filtration).

Then the weight $W^m$ is adjusted and decided with a weight adjuster 105 from the measurement data Y and $S^m$ (m indicates a repeated step) employing the method described hereinafter (ST 105).

Then a spline filter output $S^{m+1}$ is obtained from the weighted spline filter as expressed by the following equation:

$$(W^m + \alpha Q) S^{m+1} = W^m Y \tag{52}$$

in a spline filter output computing unit 106 (ST 106).

Herein determination concerning convergence of a weight as described below (ST 107) is executed by a convergence determining unit 151, and when it is determined that the conditions for convergence have not been established, m is updated (m=m+1) (ST 110), and again the weight $W^m$ is adjusted (ST 105).

When it is determined that the conditions for convergence have been established (ST 107, YES), the repetitive processing is terminated to obtain an output value $S^m$ from the robust spline filter (ST 108), and a spline curve is outputted to an output unit 107.

In the processing described above, as a method of adjusting and deciding the weight $W^m$ (ST 105), the adaptive type of biweight method is employed to decide the weight $W^m$ as expressed by the following equation:

$$W_k^m = \begin{cases} \left[1 - \left(\dfrac{y_k - s_k^m}{\beta \cdot c}\right)^2\right]^2 & |y_k - s_k^m| < \beta \cdot c \\ 0 & |y_k - s_k^m| \geq \beta \cdot c \end{cases} \tag{53}$$

wherein β and C are expressed by the following equations:

$$\beta = \text{median}\left\{\left|\dfrac{y_k - s_k^m}{\sigma}\right|\right\} \tag{54}$$

$$c = \begin{cases} 6 & \beta \leq 5 \\ 10 & 5 < \beta \leq 100 \\ 20 & 100 < \beta \end{cases} \tag{55}$$

wherein σ indicates a standard deviation of the residual error.

As for the conditions for convergence in ST 107, the repetitive processing is terminated at a point of time when change of the weight becomes sufficiently small and the equation shown below is satisfied:

$$\sum_{k=0}^{n-1} |w_k^m - w_k^{m-1}| < 0.02 \cdot \sum_{k=0}^{n-1} w_k^m \qquad (56)$$

FIG. 20A and FIG. 20B each shows an example in which the signal processing method by robust spline filtration based on this third reference technology is executed to one-dimensional time-series data. These figures show the signal processing method for measurement data with spike noise added thereto, and a spline curve as a result of ordinary spline filtration and a spline curve as a result of robust spline filtration according to the present invention are shown in the figures respectively. As clearly understood from the figures, the result of spline filtration is affected by the spike noise, while the result of robust spline filtration shows a spline curve reflecting the actual form. Further as understood from FIG. 20A, the result of robust spline filtration is excellent in the following capability for a form having mild wavinesss.

With the method as described above, the following advantages can be expected.

As a spline filter can easily be changed to a robust spline filter, deformation at a measurement start point and that at a measurement end point can be prevented, and as a form included in measurement data can be extracted without being affected by the following capability to waviness components each with a long cycle contained in the measurement data nor by noise components, filtration can be executed with high capability for following a form of a workpiece to be measured, so that reliability of the measurement data is further improved.

As locally isolated data at a singular point contained in measurement data can be deleted, so that the reliability of the robust spline filtration is further improved.

The larger the difference of measurement data from a spline curve computed through the weighted spline filter equation is, the smaller the weight is, so that the robust spline filtration not affected by abnormal data contained in measurement data can be executed.

When a change of a weight drops to a prespecified value or below in the repetitive loop processing, it can be determined that the weight has converged, so that unnecessary repetitive loop processing can be prevented, and a period of time required for the robust spline filtration can be shortened.

Fourth Reference Technology

The second processing sequence for realizing the robust spline filter is described below. The processing sequence is the same as the first processing sequence, but is different from the latter in the equations used for computing.

The equation for the weighted spline filter is prepared by deforming the equation:

$$(W + \alpha Q)S = WY \qquad (57)$$

to obtain the following equation:

$$(I + \alpha Q)S = WY + (I - W)S \qquad (58)$$

In the repetitive step m, the following equation is used:

$$(I + \alpha Q)S^{m+1} = W^m Y + (I - W^m)S^m \qquad (59)$$

As a feature of this second processing sequence, in addition to the advantages provided by the first processing sequence, the following advantages can be expected. Namely, a coefficient matrix in the left side expressed below:

$$I + \alpha Q \qquad (60)$$

has always the same value in the repetitive steps, so that a total period of time required for the robust spline filtration may be shortened.

Fifth Reference Technology

As a fifth reference technology according to the signal processing method of the present invention, the signal processing method for measurement data which is two-dimensional data obtained by means of two-dimensional measurement is described below. The measurement data as two-dimensional data as used herein indicates, for instance, (x, y) coordinate values or the like obtained by using, for instance, a coordinate measuring machine for measuring a contour curved surface of a workpiece to be measured with a prespecified pitch and keeping the z coordinate unchanged. The measurement data also includes data obtained, for instance, when a figure drawn on a plain is read with a scanner. Namely in the first reference technology, a workpiece for measurement is only y coordinate, but in the fifth reference technology, workpieces for measurement are x coordinate and y coordinate.

The basic configuration of the fifth reference technology is the same as that of the third reference technology, and is characterized in the equation corresponding to the equation (21) which is an initial equation for obtaining a spline curve s.

In the fifth reference technology, measurement data $(x_k, y_k)$ and a spline curve providing a minimum sum of squares of distances in the x-axial direction and y-axial direction with a point $(s_x (x_k, y_k), s_y (x_k, y_k))$ on a spline curve corresponding to the measurement data are obtained under the condition that the spline energy is minimized. Namely, the spline function s minimizing I(s) expressed by the following equation is obtained under the additional condition described above:

$$I(s) = \sum_{k=0}^{n-1} w_k [\{x_k - s_x(x_k, y_k)\}^2 + \{y_k - s_y(x_k, y_k)\}^2] + \qquad (61)$$

$$\alpha \sum_{k=0}^{n-1} \{\nabla_x^2 s(x_k, y_k) + \nabla_y^2 s(x_k, y_k)\}$$

wherein, in the second term in the right side, the Laplace secondary approximation is expressed as shown below:

$$\nabla_x^2 s(x_k, y_k) = s_x(x_{k+1}) - 2s_x(x_k) + s_x(x_{k-1})$$

$$\nabla_y^2 s(x_k, y_k) = s_y(y_{k+1}) - 2s_y(y_k) + s_y(y_{k-1}) \qquad (62)$$

Then the weighted spline filtration described in the third reference technology is executed for x component and y component respectively (Refer to the equation (52)).

Herein the constant α is given based on the sampling pitch Δl and the cut-off wavelength $\lambda'_c$ each along a measurement route by computing with the following equation:

$$\alpha = \frac{1}{16 \sin^4 \left( \frac{\pi \cdot \Delta l}{\lambda'_c} \right)} \qquad (63)$$

With the operations described above, a spline filter for deriving a spline curve for each zone in the two-dimensional data is realized.

Further in the robust spline filter repeating the processing until the equation (56) for convergence condition is satisfied by updating the weight W, $(y^k-s^k_m)$ in the equation (53) is used as the point-to-point distance in the following equation. Namely $(y^k-s^k_m)$ in the equation (53) is used as a distance between the measurement data $(x_k, y_k)$ and a point $(s_x(x_k, y_k), s_y(x_k, y_k))$ on a spline curve s corresponding to the measurement data $(x_k, y_k)$:

$$d_k = \sqrt{\{x_k-s_x(x_k,y_k)\}^2+\{y_k-s_y(x_k,y_k)\}^2} \quad (64)$$

Convergence of the weight W computed through the equation (53) derived from the equation (64) is used for determination thereof in the equation (56). When the weight W has converged, a spline curve corresponding to the measurement data is obtained from the output value $S^m$ (spline function). This spline curve is outputted to the output unit.

Figure 21A:
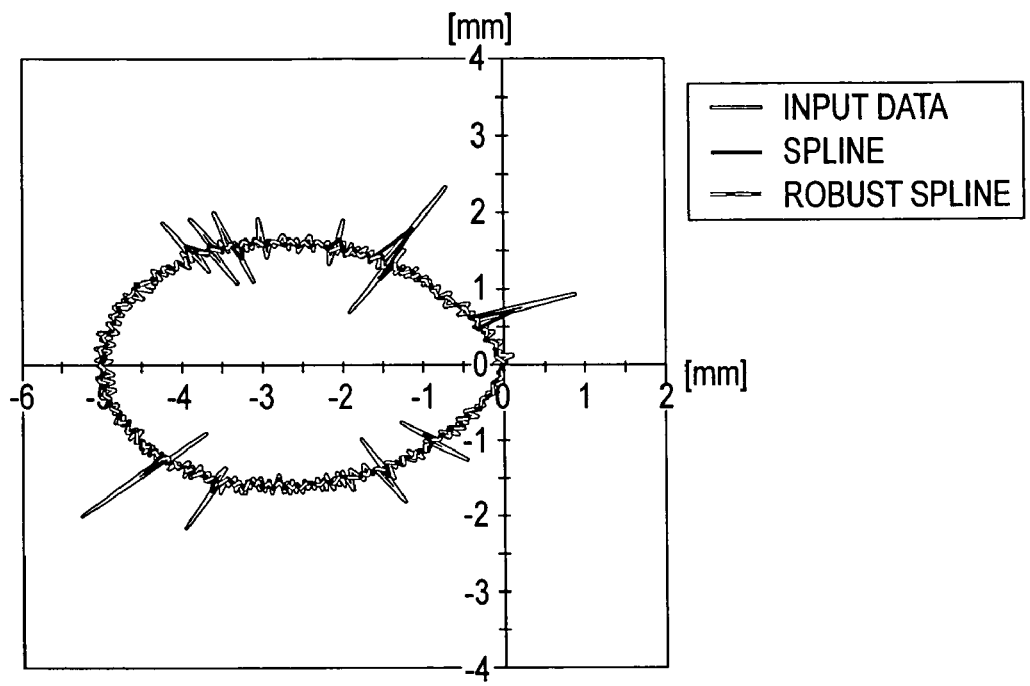
FIG. 21A and FIG. 21B are views each showing comparison between a result of spline processing and a result of robust spline processing in a fifth reference technology according to the preset invention.
Figure 21B:
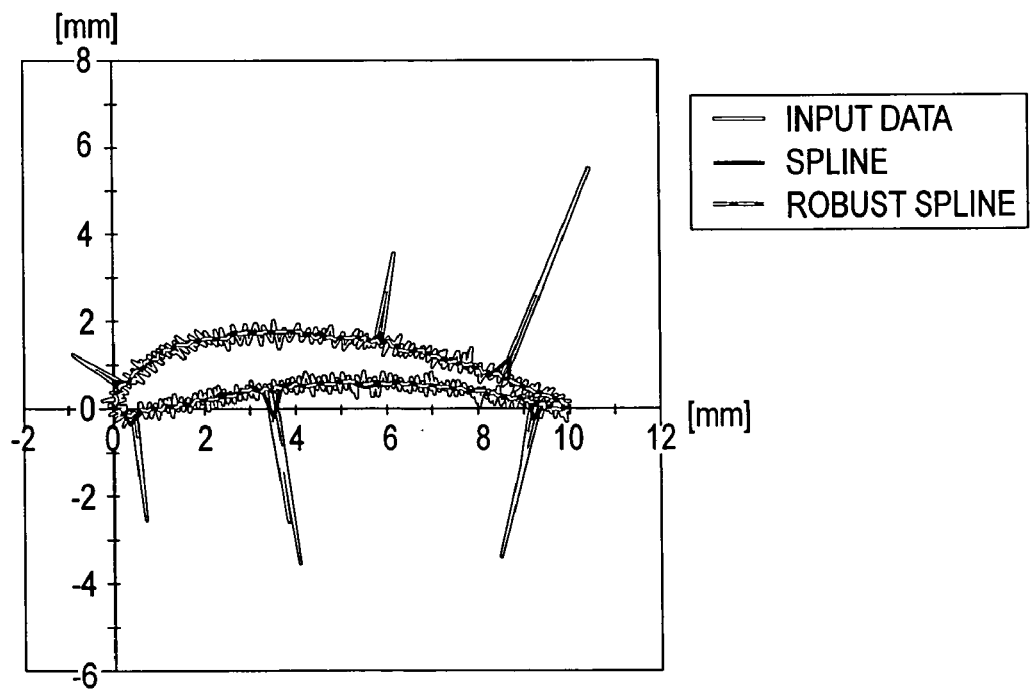

FIG. 21A shows a comparison between a result of spline processing of input data in which spike noise is added to a folium line and a result of robust spline processing of the same measurement data. It is understood from FIG. 21A that the result of simple spline processing is affected by the spike noise, but that the result of the robust spline processing is robust without being affected by the spike noise. FIG. 21B shows a comparison between a result of spline processing of input data in which spike noise is added to an air foil and a result of the robust spline processing of the same measurement data, and the result is the same as that shown in FIG. 21A.

In this fifth reference technology, in addition to the advantages provided in the third and fourth reference technologies described above, the following advantages are provided.

When the measurement data is two-dimensional data in an orthogonal coordinate system, a difference of measurement data from a spline curve is decided by a sum of squares of a component in each axial direction (for instance, x-axial component, y-axial component), so that the difference can easily be computed. Therefore a weight for each measurement data can easily be decided.

Even when the measurement data is two-dimensional data, a spline filter output can be obtained based on a result of computing with a weighted spline filter for each component in each axial direction (for instance, x-axial component, y-axial component), so that computing can easily be carried out even for a complicated curve, and therefore a period of time required for robust spline filtration for measurement data can be shortened.

Even when a workpiece for measurement is measured by scanning in the two-dimensional plain to obtain two-dimensional data and the two-dimensional data is inputted as measurement data, as the measurement data is inputted with a prespecified space along a measurement route, a form changing point (such as, for instance, a changing point from a straight portion to a circular portion or a boundary point of a step) can be grasped more accurately as compared to a case in which measurement data is inputted, for instance, with a prespecified space in the x-axial direction. Namely, erroneous determination concerning a form can be prevented, which enables input of more reliable measurement data.

Sixth Reference Technology

Next a signal processing method for measurement data which is three-dimensional data obtained by three-dimensional measurement is described as a sixth reference technology according to the signal processing method of the present invention. In the following descriptions, the three-dimensional measurement data means (x, y, z) coordinate values and the like obtained by measuring a surface of a workpiece for measurement with a prespecified pitch using, for instance, a coordinate measuring machine. Namely in the third reference technology, a workpiece of the processing is only y coordinate, but in the sixth reference technology, three factors of x coordinate, y coordinate, and z coordinate are processed.

Also the basic configuration of the sixth reference technology is the same as that of the third reference technology, but is characterized in the equation corresponding to the equation (21) which is a starting equation for obtaining a spline curve s.

In the sixth reference technology, a spline curve minimizing a sum of squares of distances in the x-, y-, and z-axial directions between the measurement data $(x_y, y_k, z_k)$ and a point $(s_x(x_k, y_k, z_k), s_y(x_k, y_k, z_k), s_z(x_k, y_k, z_k))$ on a spline curve s corresponding to the measurement data $(x_y, y_k, z_k)$ is obtained under the condition that the spline energy is minimized. Namely, the spline function s minimizing the I(s) expressed by the following equation is obtained under the additional condition described above:

$$I(s) = \sum_{k=0}^{n-1} [\{x_k - s_x(x_k, y_k, z_k)\}^2 + \\ \{y_k - s_y(x_k, y_k, z_k)\}^2 + \{z_k - s_z(x_k, y_k, z_k)\}^2] + \\ \alpha \sum_{k=0}^{n-1} \{\nabla_x^2 s(x_k, y_k, z_k) + \nabla_y^2 s(x_k, y_k, z_k) + \nabla_z^2 s(x_k, y_k, z_k)\} \quad (65)$$

wherein, in the second term in the right side, a Laplace secondary approximation is expressed like in the fifth reference technology.

Then the weighted spline filtration as described in the third reference technology is executed for each of the x component, y component, and z component respectively (Refer to the equation (52)). The constant $\alpha$ is defined with the sampling pitch $\Delta 1$ and the cut-off wavelength $\lambda'_c$ along a measurement route in a three-dimensional space through the equation (63).

Then a spline filter for deriving a spline curve in each zone for three-dimensional measurement data is realized.

Further in the robust spline filter repeating the processing until the equation (56) for convergence condition is satisfied by updating the weight W, $(y^k-s^k_m)$ in the equation (53) is used as a point-to-point distance given in the following equation. Namely $(y^k-s^k_m)$ is used as a distance between measurement data $(x_y, y_k, z_k)$ and a point $(s_x(x_k, y_k, z_k), s_y(x_k, y_k, z_k), s_z(x_k, y_k, z_k))$ on a spline curves corresponding to the measurement data $(x_y, y_k, z_k)$:

$$d_k = \sqrt{\{x_k-s_x(x_k,y_k,z_k)\}^2+\{y_k-s_y(x_k,y_k,z_k)\}^2+\{z_k-s_z(x_k,y_k,z_k)\}^2} \quad (66)$$

Convergence of the weight W computed through the equation (53) derived from the equation (66) is determined with the equation (56). When the weight W has converged, a spline curve corresponding to measurement data is obtained from the output value $S^m$ (spline function). This spline curve is outputted to the output unit.

In the sixth reference technology described above, in addition to the advantages provided in the third and fourth reference technologies, the following advantages are provided.

The advantages provided by the fifth reference technology can applied even to three-dimensional data. Therefore, even when the measurement data is three-dimensional data, workload for computing can be reduced without increase in a period of time required for robust spline filtration.

Reference Variant 4

A reference variant 4 of the signal processing method according to the present invention is described below. In the third reference technology, a case is described in which a spline curve at a point of time when it is determined that convergence has occurred is outputted as it is as a result of signal processing, but in this reference variant 4, the spline curve is again computed and then a result of computing is outputted as a result of signal processing.

Figure 23:
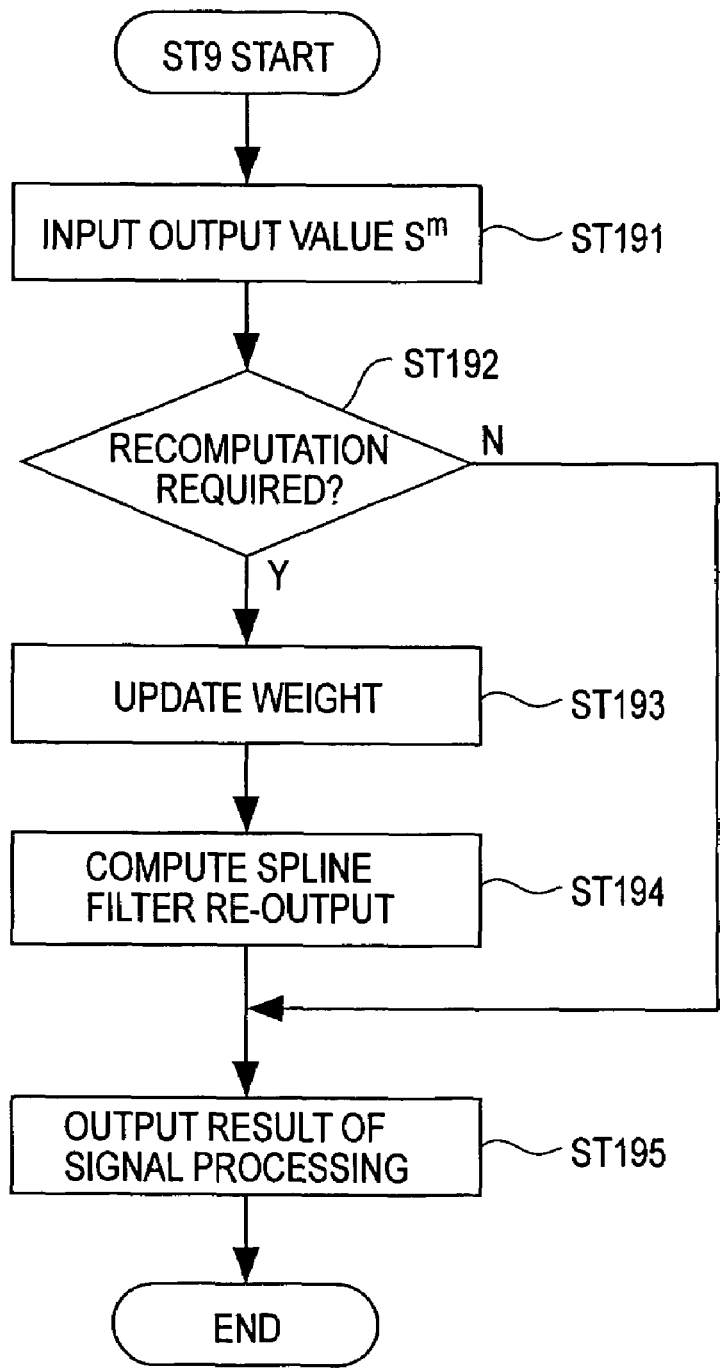
FIG. 23 is a flow chart showing a reference variant of the present invention.

FIG. 23 shows a variant of the spline curve output (ST 109) in FIG. 18.

Herein, at first the fetched output value Sm is inputted (ST 191). Then, whether re-computing is required or not is determined (ST 192). The operator is required at the time point only to input YES when a result of signal is to be obtained with high precision, and NO when it is determined that a result was obtained with sufficient precision. Alternatively, the operator may previously specify whether a result of signal processing should be provided with high precision or not.

When it is determined that re-computing is not required (NO), a spline curve corresponding to the output value Sm is outputted by an output unit 7. When it is required that re-computing is required (YES), a weight surpassing a prespecified value is updated to 1 (ST 193). Namely, measurement data having a weight larger than the prespecified value is regarded as effective data, and a contribution degree thereof to spline computing is regarded as 100%.

Then an output is obtained by executing weighted spline filtration based on the updated weight (ST 194). The spline curve obtained in this step is outputted as a result of signal processing to the output unit 7 (ST 195).

As the reference variant 4 can be carried out in the third to sixth reference technologies, in addition to the advantages as described above, the following advantages are provided.

When it is determined in the convergence determination step that weight convergence has occurred, if the weight is over a prespecified value, the weight is updated to 1 to obtain a spline filter output again, and the result can be outputted as a result of signal processing. Namely, the weight adjustment step and the spline filter output computing step are repeated, and when it is determined that the weight has converged, the measurement data at points where weights are over the prespecified value are regarded as effective data, and the weights are updated to 1, and thus as the spline filter output can be obtained again, the robust spline filtration for measurement data can be executed more accurately. Then the result is outputted as a result of signal processing, namely as a spline curve with a sufficiently small error from the original form component included in the measurement data, the robust spline filtration well following an actual form can be executed.

Other Aspects of the Present Invention

A signal processing method for executing filtration of measurement data at a specified dimension according to one aspect of the present invention includes a measurement data input step of inputting the measurement data along a measurement route; a selection step of selecting an equation for weighted spline filtration according to a type of the measurement data; an initialization step of giving a weight for the measurement data as a unit matrix to obtain an initial value of a spline filter output; an adjustment step of adjusting and deciding a weight for the measurement data; a spine filter output computing step of obtaining a spline filter output by using the weight decided in the weight adjustment step; a convergence determination step of determining whether the weight has converged or not; and an output step of outputting a result of signal processing based on the spline filter output, and in this aspect, preferably the robust spline filtration should be executed to the measurement data, when it is determined in the convergence determination step that the weight has not converged yet, by updating the weight and repeating the weight adjustment step and the spline filter output computing step.

With this aspect, an equation for weighted spline filtration is selected, and a spline curve as a spline filter output is repeatedly computed by successively updating the weight based on the selected equation for spline filtration, so that the robust spline filtration of the measurement data can easily be executed assuming the spline curve at the time point of convergence of the weight as a filter output which is a result of signal processing. Because of the features as described above, the end-effects at a start point of measurement data and also at an end point thereof can be prevented, and a form included in measurement data can be extracted without being affected by the following capability to waviness components each having a long cycle nor by noise components contained in the measurement data. As a result, filtration well reflecting the actual form can be performed, so that the reliability of measurement data is further improved.

The measurement data at a prespecified dimension as used herein indicates measurement data such as one-dimensional time series data (such as, for instance, data obtained by measuring displacements in the y-axial direction at positions with a prespecified space therebetween in the x-axial direction on an orthogonal x and y coordinate plain), two-dimensional data (free curve data on an X-Y plain defined by x-axis and y axis crossing each other at right angles), three-dimensional data (a free space curve data in a x-y-z space defined by x axis, y axis, and z axis crossing at right angles), or a polar coordinates defined by a radius and an angle.

Input of measurement data along a measurement route as used herein indicates inputting measurement data in a prespecified scanning direction or inputting measurement data obtained by measuring a surface of a workpiece to be measured.

Further in this aspect, the weight decided in the weight adjustment step should preferably as small as possible when a difference of the measurement data from the spline curve computed through the equation for weighted spline filter is large.

With this aspect, the larger the difference of the measurement data from the spline curve computed through the equation for weighted spline filter is, the smaller the weight is, so that the robust spline filtration can be carried out without being affected by abnormal data included in the measurement data. Namely, a spline curve is repeatedly obtained by making smaller the weight for the measurement data away from the spline curve and also making larger the weight for the measurement data close to the spline curve. With the operations, the spline curve gradually gets closer to the actual form components (such as true values for an actual form of the workpiece to be measured or the like). The final spline curve obtained the time point when it is determined that the weight has converged is obtained as a form component with a sufficiently small error from the actual form component. As a result, the extremely excellent robust spline filtration can be carried out.

Further in this aspect, the prespecified dimension of the measurement data preferably includes two- or three-dimensional component, and the difference of the measurement data is decided by a sum of squares of each component.

Further with this aspect, when the measurement data is two-dimensional data or three-dimensional data in an orthogonal coordinate system, a difference of the measurement data from the spline curve is decided based on a sum of squares of each of the component in each axial direction (such as x-axial component, y-axial component, z-axial component, and the like), so that the difference can easily be computed. For the features as described above, a weight for each measurement data can easily be decided.

In the convergence determination step according to this aspect, it is preferable to determine that the weight has converged when a change of the weight decided in the weight adjustment step drops to a prespecified value or below.

In this aspect of the present invention, it can be determined, when a change of a weight in the repetitive loop processing had dropped to a prespecified value or below, that the weight has converged, so that increase of processing time due to unnecessary repetitive loop can be prevented, and the time required for robust spline filtration can be shortened. Further when a change of the weight dropped to a prespecified value or below, it can be determined that an error of the spline curve from the actual form component included in the measurement data has become sufficiently small, so that the robust spline filtration can be executed in the extremely excellent state.

In this aspect of the present invention, the output step preferably includes an updating step of updating, when a weight for the measurement data is over a prespecified value, the weight to 1; a spline filter re-output computing step of obtaining a spline filter output based on the updated weight; and a signal processing result output step of outputting the spline filter output in the spline filter re-output computing step as a result of signal processing.

In this aspect of the present invention, when it is determined in the convergence determination step that the weight has converged, if the weight is over a prespecified value, the weight is updated to 1 to obtain a spline filter output again, and the result can be outputted as a result of signal processing. Namely, at a point of time when it is determined, after the weight adjustment step and spline filter output computing step are repeated several times, that the weight has converged, the measurement data with the weight over a prespecified point is regarded as effective data with the weight updated to 1, and then a spline filter output is obtained again. With the operations above, the robust spline filtration for measurement data can be performed more accurately. Then the result is outputted as a result of signal processing, so that it is possible to obtain a spline curve with a sufficiently small error against the actual form component included in the measurement data. As a result, the robust spline filtration well reflecting the actual form can be performed.

Further in this aspect of the present invention, the measurement data preferably includes components at two- or higher dimension in an orthogonal coordinate system, and when the spline filter output is to be obtained, the spline filter output is preferably obtained based on a result of weighted spline filtration for each of the components.

In this aspect of the present invention, even when measurement data is two-dimensional data or three-dimensional data, a spline filter output can be obtained based on a result of a weighted spline filtration for each component in each axial direction (such as x-axial component, y-axial component), and therefore even computing for a complicated curve can easily be performed, and a period of time required for the robust spline filtration of measurement data can be shortened.

Further in this aspect of the present invention, in the measurement data input step, the measurement data is preferably inputted with a prespecified space along the measurement route.

In this aspect of the present invention, not only the input data is inputted along a prespecified scanning direction, but also even when measurement data obtained by scanning along a surface of a workpiece to be measured is inputted, the measurement data is inputted with a prespecified space along the measurement route, a form changing point (such as a changing point from a straight portion to a circular portion or a boundary point of a step) can be grasped more accurately as compared to a case where measurement data is inputted with a prespecified space in the x-axial direction. Namely, a mistake in determination on a form of a workpiece to be measured can be prevented, which enables input of measurement data with higher reliability.

In this aspect of the present invention, the measurement data input step preferably includes a step of deleting singular point data locally isolated from the measurement data.

In this aspect of the present invention, for instance, locally and extremely isolated data (such as data obtained at a point and having an extremely different value from those obtained at adjoining points) included in the measurement data due to, for instance, generation of strong induction noise caused by a power machine in a plant as a noise source can previously be deleted as clear singular point data, so that the reliability of the robust spline filtration is further improved.

The signal processing program in this aspect of the present invention preferably makes a computer execute the signal processing method. Further the recording medium according to the present invention preferably records therein the signal processing program in the computer-readable state. Further the signal processor according to the present invention preferably makes the computer execute the signal processing program.

With the configuration, by compiling a program so that each of the steps described above is executed by a computer incorporating a CPU (Central Processing Unit) or a memory (storage device), it is possible not only to adjust a weight and make determination concerning convergence of the weight, but also to easily change various parameters for deciding a difference according to a dimension or dimensions of measurement data. The program as described above may be installed in the computer by directly setting the recording medium with the program recorded therein, or a reader capable of reading out information from the recording medium is externally connected to the computer so that the program can be installed in the computer with this reader. Further the program may be fed to and installed in a computer via a communication line such as the Internet, LAN cable, telephone line, radio communication network or the like.

In this aspect of the present invention, there is preferably provided a signal processing filter for executing signal processing by summing products for a prespecified distribution function in relation to digital signals at a specified dimension measured along a prespecified measurement route, and the distribution function is defined with a sampling pitch along the prespecified route and a cut-off wavelength along the prespecified route, and further the signal processing filter preferably has a filtration executing section for obtaining a filter output value for each component by multiplying components of the digital signal value with the distribution function.

With the configuration as described above, signal processing is executed for each component of a digital signal value at a specified dimension, for instance, a two-dimensional or three-dimensional signal value. In this signal processing, the filtration executing section obtains a filter output value by multiplying an inputted digital signal by a distribution function and linearly summing the products. The distribution function is defined a sampling pitch and a cut-off wavelength each along a route for extracting a digital signal. Namely, a sum of products of digital signals is computed through the distribution function by scanning along the route for extracting digital signals. As a result, reliable signal processing can be executed along the route for extracting signals.

As described above, signal processing can be executed accurately not only for one-dimensional data, but also for two- or three-dimensional digital data by executing signal processing for each component of a digital signal through the distribution function along the sampling route. As a result, for instance, even when signal processing executed for data concerning a form of a surface of a workpiece to be measured, form analysis can be made along the measurement route, so that changing points in the form can accurately be grasped, which enables further improvement in precision of form analysis.

In this aspect, the signal processing filter preferably includes a weighting factor computing section for computing a weighting factor for each of the digital signal values, and the filtration executing section preferably executes an operation for summing products of the distribution function with the weighting factor computed in the weighting factor computing section for each component of the digital signal.

With the configuration as described above, a weighting factor is set by the weighting factor computing section for each digital signal. A weight for each digital signal is adjusted according to this weighting factor, and further an operation for summing products by the distribution function is executed.

By adjusting a weighting factor for each of the digital signals, for instance, influence by abnormal data can be excluded.

In this aspect of the present invention, the weighting factor computing section preferably decide the weighting factor according to a difference between the digital signal value and the filter output value for the digital signal value computed based on a sum of squares of each components of the digital signal value.

With the configuration as described above, the weighting factor computing section is required only to compute a digital signal value and a sum of squares of each component of the digital signal, so that the work load to the weighting factor computing section is reduced. Although it is possible to decide a weighting factor based on the shortest distance between a digital signal and a curve obtained by filtration, but in that case the load for computing data at a higher dimension substantially increases. With the present invention, however, a number of computing steps is small, so that the output response speed can substantially be raised.

In this aspect, the weighting factor computing section re-computes the weighting factor using a filter output value from the filtration executing section, and the signal processing filter has a convergence determination section for determining whether the weighting factor has converged or not based on a change rate of the weighting factor computed in the weighting factor computing section as well as of the weighting factor computing in the previous step, and further the filtration executing section outputs a filter output value based on the weighting factor determined as converged by the convergence determination section.

With the configuration as described above, whether the signal processing is to be terminated or not is determined by the convergence determination section based on a change rate of a weighting factor. When it is determined that the weighting factor has converged, computing of a weighting factor is terminated, and a filter output is obtained according to the converged weighting factor. As determination concerning convergence is made on a change rate of a weighting factor, a result of signal processing with a converged weighting factor can be obtained for all digital signal values.

In this aspect of the present invention, signal processing can be executed to two- or three-dimensional digital signal values.

In this aspect, the distribution faction is preferably the Gaussian distribution function.

With the configuration as described above, the Gaussian filter or the robust Gaussian filter can be constructed.

The distribution may be a box-type function constituting a movement averaging filter.

In this aspect of the present invention, the signal processing filter includes a weighting factor computing section for computing a weighting factor for each of the digital signal values, and the weighting factor computing section preferably divides the digital signal to a plurality of zones with a pre-specified pitch along a measurement route, computes the digital signal value and a median for a difference based on a sum of squares of components of each of the digital signal values, and decides a weighting factor for each signal value through an equation for deciding a weighting factor based on the median for this zone.

With the configuration as described above, as data in each zone is weighted according to the median data computed for the zone, a filter output well reflecting actual data for each zone can be obtained. The equation for deciding a case based on a median computed for each zone may be applied to all of signal values in the zone, or a portion of signal values in the zone. The zone pitch is, for instance, substantially equal to the cut-off wavelength.

This aspect of the present invention provides a signal processing method for executing signal processing by summing products for a prespecified distribution function for digital signal values at a specified dimension obtained through measurement along a specified route, and the distribution function is defined by sampling pitch along the specified route and a cut-off wavelength along the specified route, and preferably includes a weighting factor computing step of computing a weighting factor for each of the digital values, and a filtration executing section for summing products of the weighting factor computed in the weighting factor computing step by the distribution function for each component.

With the configuration as described above, the advantages provided by the invention described above can be achieved. Namely, by adjusting a weight for ach of the digital signal values, for instance, influence by abnormal data can be excluded.

In this aspect of the present invention, the weighting factor computing step preferably decides the weighting factor based on a difference between the digital signal value and a sum of squares of each component of the filter output value for the digital signal value.

With the configuration as described above, the advantages provided by the invention described above can be achieved. It is required only to compute a digital signal value and a sum of squares of each component of a filter output value for the digital signal value, so that the work load for computing is reduced.

In this aspect of the present invention, the weighting factor computing step preferably includes a convergence determination step in which the weighting factor is re-computed using a filter output value obtained in the filtration executing section and determination concerning convergence of the weighting factor is made based on a change rate of the weighting factor computed in the weighting factor computing step as well as of the weighting factor computed in the previous step, and the filtration executing step preferably outputs a filter output value using the weighting factor determined as converged in the convergence determination step.

With the configuration as described above, the advantages provided by the invention described above can be achieved. Namely, as convergence of a weighting factor is determined, it is not necessary to execute unnecessary repetitive computing, and further as convergence is determined based on a change rate of the weighting factor, so that an accurately converged result can be obtained for all digital signal values.

The signal processing method in this aspect of the present invention executes filtration for measurement data at a specified dimension, and including a measurement data input step of inputting the measurement data along a measurement route; a selection step of selecting a weighted spline filter according to a type of the measurement data; an initialization step of giving a weight for the measurement data in the form of a unit matrix to obtain an initial value of the spline filter output; an adjustment step of adjusting and deciding a weight for the measurement data; a spline filter output computing step of obtaining a spline filter output by using the weight decided in the weight adjustment step; a convergence determination step of determining whether the weight has converged or not; and an output step of outputting a result of signal processing based on the spline filter output, and the signal processing method is characterized in that, when it is determined in the convergence determination step that the weight has not converged, the weight adjustment step and spline filter output computing step are repeated updating the weight to subject the measurement data to the robust spline filtration, and also in that the weight adjustment step divides the measurement data into a plurality of zones with a prespecified pitch along a route, computes a median for a difference between each measurement data and the spline curve computed by the equation for the weighted spline filtration, and decides a weight for each data in the zone with the equation for deciding a weighting factor based on the median for the zone.

With the present invention, an equation for weighted spline filtration is selected, a spline curve reflecting spline filter outputs is repeatedly computed by successively updating the weight based on the selected equation for spline filtration, so that the measurement data can easily be subjected to the robust spline filtration providing a spline curve at the time of convergence of the weight as an filter output which is a result of signal processing. Because of the features, end-effects at a start point and at an end effect of the measurement data can be prevented, and a form included in the measurement data can be extracted without being affected by following capability for waviness components each having a long cycle nor by noise components included in the measurement data. As a result, filtration well reflecting the actual form can be executed, and reliability of measurement data is further improved.

A weight for data in each data is decided based on median data computed for the data, so that a filter output well reflecting actual data for each zone can be obtained. The equation for deciding a weight based on a median for each zone may be applied to all signal values in the zone or to a portion of the signal values in the zone. The zone pitch is, for instance, substantially equal to the cut-off wavelength.

The signal processing, signal processing method, signal processing program, recording medium, and measuring instrument according to the present invention are not limited to those described in the embodiments, reference technologies, and reference variants, and it is needless to say that various modifications and changes are possible within the gist of the present invention.

For instance, the computing section 52 may be a computer including a CPU (Central Processing Unit) or a memory (storage device) for realizing each of functions executed by the filtration executing section 57, weighting factor computing section 56, and convergence determining section 58. In this case, the signal processing program for making the computer execute the functions executed by the filtration executing section 57, weighting factor computing section 56, and convergence determining section 58 may be installed via a communication network such as the Internet or via a recording medium such as a CD-ROM or a memory card. Further a reader for reading data stored in the recording medium may be externally attached thereto. With the configuration as described above in which the computing section 52 is configured with a computer and signal processing is executed by software, some of parameters such as a sampling pitch, a cut-off wavelength, and conditions for convergence can easily be changed.

For instance, in the second reference technology, a weighting factor is computed by the Biweight method and the constant c is decided through the equation (9) according to the median data β, but the constant c may be a prespecified fixed value.

Further the Beaton function may be employed in place of the adaptive type Biweight method for computing a weighting factor.

The priority application Number JP2004-010921 upon which this patent application is based is hereby incorporated by reference.

What is claimed is:

1. A signal processor for filtering digital signal values in a prespecified dimension measured along a preset route, comprising:
   a weighting factor calculating section for calculating a weighting factor for each of the digital signal values as well as for re-calculating and updating the weighting factor; and
   a filtration executing section for executing filtration using the calculated weighting factor to obtain a filter output value for each digital signal value,
   wherein the weighting factor calculating section comprises:
      a first zone generating section for generating a plurality of first zones by dividing the digital signal values into a plurality of first zones along the preset route; and
      a median calculating section for calculating a median for each of the first zones for a difference based on a sum of squares for respective components of the digital signal value and the filter output value for the digital signal value,
   wherein the weighting factor calculating section calculates the weighting factor based on the median in each of the first zones for the digital signal values in the respective first zones and updates the weighting factor.

2. The signal processor according to claim 1, wherein the filtration executing section executes robust spline filtration processing using a spline function.

3. The signal processor according to claim 1, wherein the filtration executing section executes robust Gaussian filtration processing using a Gaussian function.

4. A signal processor for filtering digital signal values in a prespecified dimension measured along a preset route, comprising:

a weighting factor calculating section for calculating a weighting factor for each of the digital signal values as well as for recalculating and updating the weighting factor; and a filtration executing section for executing filtration using the calculated weighting factor to obtain a filter output value for each digital signal value, wherein the weighting factor calculating section comprises:

a first zone generating section for generating a plurality of first zones by dividing the digital signal value into a plurality of zones along the preset route;

a second zone generating section for generating a plurality of second zones corresponding to the first zones along the preset route of the digital signal value; and a median calculating section for calculating a median for a difference in accordance with a sum of squares for respective components of the digital signal value and the filter output value for the digital signal value for the respective second zones, wherein the weighting factor calculating section calculates the weighting factor based on the median for the second zones corresponding to the respective first zones concerning the digital signal values in the respective first zones and updates the weighting factor.

5. The signal processor according to claim 4, wherein the second zone generating section generates the second zones each having a larger zone width as compared to a width of the first zones.

6. The signal processor according to claim 5, wherein the first zone generating section generates the first zones in which the digital signal values of adjacent first zones are sequentially connected to each other, and the second zone generating section generates the second zones including the digital signal values of the corresponding first zones and having portions in which adjacent second zones are overlapping with each other.

7. The signal processor according to claim 4, wherein the filtration executing section executes robust spline filtration processing using a spline function.

8. The signal processor according to claim 4, wherein the filtration executing section executes robust Gaussian filtration processing using a Gaussian function.

9. A signal processing method for filtering digital signal values in a prespecified dimension measured along a preset route, comprising the steps of:

scanning a surface of a workpiece along the preset route;

calculating a weighting factor for each of the digital signal values as well as for re-calculating and updating the weighting factor;

obtaining filter output values for the digital signal values by using the calculated weighting factor;

obtaining a spline curve from the filter output values; and displaying the spline curve on a display section to determine the measurement of the surface of the workpiece along the preset route, wherein calculating the weighting factor comprises the steps of:

generating a plurality of first zones by dividing the digital signal values into a plurality of first zones along the preset route; and calculating a median for a difference in accordance with a sum of squares for respective components of the digital signal value and the filter output value for the digital signal value, wherein the weighting factor calculation is based on the medians for the respective first zones concerning the digital signal values in the respective first zones.

10. The method according to claim 9, wherein the method is implemented by a signal processing program that instructs a computer to execute the method steps for filtering digital signal values.

11. The method according to claim 10, wherein the signal processing program is recorded on a recording medium.

12. The signal processing method for filtering digital signal values in a prespecified dimension measured along a preset route, comprising:

scanning a surface of a workpiece along the preset route;

calculating a weighting factor for each of the digital signal values as well as for re-calculating and updating the weighting factor;

obtaining filter output values for the digital signal values using the calculated weighting factor obtaining a spline curve from the filter output values; and displaying the spline curve on a display section to determine the measurement of the surface of the workpiece along the preset route, wherein calculating the weighting factor comprises the steps of:

generating a plurality of first zones by dividing the digital signal values into a plurality of first zones along the preset route;

generating a plurality of second zones corresponding to the first zones along the route of the digital signal value; and calculating a median for a difference in accordance with a sum of squares for respective components of the digital signal value and the filter output value for the digital signal value, wherein the weighting factor calculation for the digital signal values in each of the first zones is based on the median of the second zones corresponding to each of the first zones and updates the weighting factor.

13. The method according to claim 12, wherein the method is implemented by a program that instructs a computer to execute the method steps for filtering digital signal values.

14. The method according to claim 13, wherein the program is recorded on a recording medium.

15. A measuring instrument comprising:

a detector having a measuring section at an edge thereof for scanning a surface of a workpiece for measurement in one of a contact state and a non-contact state;

a moving unit for moving the measuring section two-dimensionally or three-dimensionally;

a position detecting section for outputting a measurement result obtained with the measuring section as coordinate measurement data;

a movement control section controlling movement of the measuring section, a signal processor for filtering digital signal values in a prespecified dimension measured along a preset route, the processor comprising: a weighting factor calculating section for calculating a weighting factor for each of the digital signal values as well as for re-calculating and updating the weighting factor; and a filtration executing section for executing filtration using the calculated weighting factor to obtain a filter output value for each digital signal value, wherein the weighting factor calculating section includes:

a first zone generating section for generating a plurality of first zones by dividing the digital signal values into a plurality of first zones along the preset route; and a median calculating section for calculating a median for each of the first zones for a difference based on a sum of squares for respective components of the digital signal value and the filter output value for the digital signal value, the weighting factor calculating section calculating the weighting factor based on the median in each of the first zones for the digital signal values in the respective first zones and updates the weighting factor; and an output section for outputting a result that was filtered through the signal processor.

16. A measuring instrument comprising:

a detector having a measuring section at an edge thereof for scanning a surface of a workpiece for measurement in one of a contact state and a non-contact state;

a moving unit for moving the measuring section two-dimensionally or three-dimensionally;

a position detecting section for outputting a measurement result obtained with the measuring section as coordinate measurement data;

a movement control section controlling movement of the measuring section, a signal processor for filtering digital signal values in a prespecified dimension measured along a preset route, the processor comprising: a weighting factor calculating section for calculating a weighting factor for each of the digital signal values as well as for recalculating and updating the weighting factor; and a filtration executing section for executing filtration using the calculated weighting factor to obtain a filter output value for each digital signal value, wherein the weighting factor calculating section includes:

a first zone generating section for generating a plurality of first zones by dividing the digital signal value into a plurality of first zones along the preset route; a second zone generating section for generating a plurality of second zones corresponding to the first zones along the preset route of the digital signal value; and a median calculating section for calculating a median for a difference in accordance with a sum of squares for respective components of the digital signal value and the filter output value for the digital signal value for the respective second zones, the weighting factor calculating section calculating the weighting factor based on the median for the second zones corresponding to the respective first zones concerning the digital signal values in the respective first zones and updates the weighting factor; and an output section for outputting a result that was filtered through the signal processor.

* * * * *